(12) United States Patent
Ferguson et al.

(10) Patent No.: US 10,354,253 B2
(45) Date of Patent: Jul. 16, 2019

(54) SYSTEM AND METHOD FOR IDENTITY PROTECTION USING MOBILE DEVICE SIGNALING NETWORK DERIVED LOCATION PATTERN RECOGNITION

(71) Applicant: VISA INTERNATIONAL SERVICE ASSOCIATION, San Francisco, CA (US)

(72) Inventors: William M. Ferguson, San Diego, CA (US); Randall A. Snyder, Las Vegas, NV (US); Devin P. Miller, North Bend, WA (US)

(73) Assignee: Visa International Service Association, San Francisco, CA (US)

( * ) Notice: Subject to any disclaimer, the term of this patent is extended or adjusted under 35 U.S.C. 154(b) by 63 days.

(21) Appl. No.: 15/427,712

(22) Filed: Feb. 8, 2017

(65) Prior Publication Data

US 2017/0161748 A1 Jun. 8, 2017

Related U.S. Application Data

(63) Continuation of application No. 14/446,626, filed on Jul. 30, 2014, now Pat. No. 9,603,023, which is a
(Continued)

(51) Int. Cl.
*H04W 4/02* (2018.01)
*H04W 12/02* (2009.01)
(Continued)

(52) U.S. Cl.
CPC ......... *G06Q 20/4016* (2013.01); *G06F 21/88* (2013.01); *G06Q 10/10* (2013.01);
(Continued)

(58) Field of Classification Search
CPC ....... H04W 8/04; H04W 76/02; H04W 88/06; H04W 12/08; H04W 8/06; H04W 12/02;
(Continued)

(56) References Cited

U.S. PATENT DOCUMENTS

| 4,200,770 A | 4/1980 | Hellman et al. |
| 4,218,582 A | 8/1980 | Hellman et al. |

(Continued)

FOREIGN PATENT DOCUMENTS

| CA | 2794585 | 10/2010 |
| CA | 2794585 | 1/2019 |

(Continued)

OTHER PUBLICATIONS

U.S. Appl. No. 12/628,051, "Notice of Allowance", dated Jun. 1, 2012, 12 pages.
(Continued)

*Primary Examiner* — Khawar Iqbal
(74) *Attorney, Agent, or Firm* — Kilpatrick Townsend & Stockton LLP

(57) ABSTRACT

A system and method for recognizing patterns in wireless device locations using wireless device location data derived from a communications signaling network is provided. By using wireless network supported signaling operations and messages, location data concerning the whereabouts of wireless devices, and hence wireless device users, may be obtained. The location data derived from communications signaling network may be statistically analyzed to reveal potential geographic patterns that may indicate meaningful behaviors of the purported users of the wireless devices.

18 Claims, 11 Drawing Sheets

Related U.S. Application Data continuation of application No. 13/567,468, filed on Aug. 6, 2012, now Pat. No. 8,831,564, which is a continuation of application No. 12/628,051, filed on Nov. 30, 2009, now Pat. No. 8,280,348, and a continuation-in-part of application No. 14/054,047, filed on Oct. 15, 2013, now abandoned, and a continuation of application No. 13/303,809, filed on Nov. 23, 2011, now Pat. No. 8,588,748, which is a continuation of application No. 12/332,878, filed on Dec. 11, 2008, now Pat. No. 8,116,731, and a continuation-in-part of application No. 14/196,861, filed on Mar. 4, 2014, now Pat. No. 9,432,845, which is a continuation of application No. 11/933,803, filed on Nov. 1, 2007, now Pat. No. 8,374,634, and a continuation-in-part of application No. 12/992,064, filed as application No. PCT/US2009/003007 on May 13, 2009, now Pat. No. 8,839,394, and a continuation-in-part of application No. 13/030,759, filed on Feb. 18, 2011, and a continuation-in-part of application No. 13/030,794, filed on Feb. 18, 2011, and a continuation-in-part of application No. 13/382,900, filed as application No. PCT/US2010/041264 on Jul. 7, 2010, now abandoned, and a continuation-in-part of application No. 13/387,991, filed as application No. PCT/US2010/044019 on Jul. 30, 2010, now Pat. No. 9,818,121, and a continuation-in-part of application No. 13/752,271, filed on Jan. 28, 2013, and a continuation-in-part of application No. 13/903,663, filed on May 28, 2013, now Pat. No. 9,922,323.

(60) Provisional application No. 61/167,111, filed on Apr. 6, 2009, provisional application No. 61/058,621, filed on Jun. 4, 2008, provisional application No. 61/027,892, filed on Feb. 12, 2008, provisional application No. 61/979,663, filed on Oct. 12, 2007, provisional application No. 60/909,718, filed on Apr. 3, 2007, provisional application No. 60/895,144, filed on Mar. 16, 2007, provisional application No. 61/053,152, filed on May 14, 2008, provisional application No. 61/305,830, filed on Feb. 18, 2010, provisional application No. 61/306,369, filed on Feb. 19, 2010, provisional application No. 61/223,671, filed on Jul. 7, 2009, provisional application No. 61/223,677, filed on Jul. 7, 2009, provisional application No. 61/230,628, filed on Jul. 31, 2009, provisional application No. 61/591,232, filed on Jan. 26, 2012, provisional application No. 61/659,934, filed on Jun. 14, 2012, provisional application No. 61/652,173, filed on May 26, 2012.

(51) Int. Cl.

| | | |
|---|---|---|
| *G06Q 20/40* | (2012.01) | |
| *G06F 21/88* | (2013.01) | |
| *G06Q 10/10* | (2012.01) | |
| *G06Q 40/02* | (2012.01) | |
| *H04W 12/12* | (2009.01) | |
| *H04L 29/06* | (2006.01) | |
| *H04W 12/06* | (2009.01) | |
| *H04W 8/04* | (2009.01) | |
| *H04W 8/06* | (2009.01) | |
| *H04W 88/02* | (2009.01) | |

(52) U.S. Cl.
CPC .......... *G06Q 40/02* (2013.01); *H04L 63/1408* (2013.01); *H04W 4/02* (2013.01); *H04W 8/04* (2013.01); *H04W 8/06* (2013.01); *H04W 12/06* (2013.01); *H04W 12/12* (2013.01); *G06F 2221/2111* (2013.01); *H04W 88/02* (2013.01)

(58) Field of Classification Search
CPC ........... H04W 4/02; H04Q 7/20; G06F 21/00; G06Q 20/00; G06Q 20/4016; G06Q 40/02; H04L 63/1408; H04L 63/14
See application file for complete search history.

(56) References Cited

U.S. PATENT DOCUMENTS

| | | | |
|---|---|---|---|
| 5,237,612 A | 8/1993 | Raith | |
| 5,819,226 A | 10/1998 | Gopinathan et al. | |
| 5,953,652 A * | 9/1999 | Amin .................. | H04L 63/1408 455/410 |
| 5,960,411 A | 9/1999 | Hartman et al. | |
| 6,097,938 A | 8/2000 | Paxson | |
| 6,223,290 B1 | 4/2001 | Larsen et al. | |
| 6,535,728 B1 | 3/2003 | Perfit et al. | |
| 6,612,488 B2 | 9/2003 | Suzuki | |
| 6,832,721 B2 | 12/2004 | Fujii | |
| 6,868,391 B1 | 3/2005 | Hultgren | |
| 6,895,236 B2 | 5/2005 | Shuster | |
| 6,913,194 B2 | 7/2005 | Suzuki | |
| 6,948,656 B2 | 9/2005 | Williams | |
| 7,104,444 B2 | 9/2006 | Suzuki | |
| 7,152,788 B2 | 12/2006 | Williams | |
| 7,155,739 B2 | 12/2006 | Bad et al. | |
| 7,188,251 B1 | 3/2007 | Slaughter | |
| 7,327,705 B2 | 2/2008 | Fletcher | |
| 7,376,431 B2 | 5/2008 | Niedermeyer | |
| 7,500,607 B2 | 3/2009 | Williams | |
| 7,503,489 B2 | 3/2009 | Heffez et al. | |
| 7,535,861 B2 | 5/2009 | Buchholz et al. | |
| 7,594,605 B2 | 9/2009 | Aaron et al. | |
| 7,606,560 B2 | 10/2009 | Labrou | |
| 7,669,759 B1 | 3/2010 | Zettner | |
| 7,684,809 B2 | 3/2010 | Niedermeyer | |
| 7,697,942 B2 | 4/2010 | Stevens | |
| 7,715,824 B2 | 5/2010 | Zhou | |
| 7,743,981 B2 | 6/2010 | Willaims | |
| 7,747,535 B2 | 6/2010 | Mikan et al. | |
| 7,752,135 B2 | 7/2010 | Brown et al. | |
| 7,866,544 B1 | 1/2011 | Block | |
| 7,941,835 B2 | 5/2011 | Wolfond | |
| 8,116,731 B2 | 2/2012 | Buhrrmann et al. | |
| 8,135,624 B1 | 3/2012 | Ramalingam et al. | |
| 8,140,403 B2 | 3/2012 | Ramalingam et al. | |
| 8,166,068 B2 | 4/2012 | Stevens | |
| 8,255,284 B1 | 8/2012 | Ramalingam et al. | |
| 8,280,348 B2 | 10/2012 | Snyder et al. | |
| 8,285,639 B2 | 10/2012 | Eden et al. | |
| 8,315,947 B2 | 11/2012 | Aaron et al. | |
| 8,341,029 B1 | 12/2012 | Ramalingam et al. | |
| 8,374,634 B2 | 2/2013 | Dankar et al. | |
| 8,401,906 B2 | 3/2013 | Ruckart | |
| 8,588,748 B2 | 11/2013 | Buhrrman et al. | |
| 8,615,465 B2 | 12/2013 | Boutcher et al. | |
| 8,632,002 B2 | 1/2014 | Boutcher et al. | |
| 8,831,564 B2 | 9/2014 | Snyder et al. | |
| 8,839,394 B2 | 9/2014 | Dennis | |
| 8,869,243 B2 * | 10/2014 | McGeehan ........... | G06F 21/316 726/4 |
| 9,014,693 B2 * | 4/2015 | Strittmatter ........... | H04W 12/12 455/432.1 |
| 9,098,844 B2 | 8/2015 | Davis | |
| 9,185,123 B2 | 11/2015 | Dennis | |
| 9,603,023 B2 | 3/2017 | Ferguson et al. | |
| 9,681,303 B2 * | 6/2017 | Haberkorn ............ | H04W 12/12 |
| 2002/0119766 A1 | 8/2002 | Bianconi et al. | |
| 2003/0004827 A1 | 1/2003 | Wang | |
| 2003/0182194 A1 | 9/2003 | Choey et al. | |
| 2004/0123150 A1 | 6/2004 | Wright | |
| 2004/0182923 A1 | 9/2004 | Bench | |
| 2004/0221163 A1 | 11/2004 | Jorgensen et al. | |

(56) References Cited

U.S. PATENT DOCUMENTS

| | | |
|---|---|---|
| 2004/0236850 A1 | 11/2004 | Krumm |
| 2005/0105734 A1 | 5/2005 | Buer |
| 2005/0143059 A1 | 6/2005 | Imura |
| 2005/0239445 A1 | 10/2005 | Karaoguz et al. |
| 2005/0251440 A1 | 11/2005 | Bednarek |
| 2005/0278192 A1 | 12/2005 | Cantini et al. |
| 2005/0278542 A1 | 12/2005 | Pierson |
| 2005/0280557 A1 | 12/2005 | Jha |
| 2006/0194592 A1 | 8/2006 | Clough |
| 2006/0237531 A1 | 10/2006 | Heffez et al. |
| 2007/0061273 A1 | 3/2007 | Greene et al. |
| 2007/0072587 A1 | 3/2007 | Della-Torre |
| 2007/0073717 A1 | 3/2007 | Ramer |
| 2007/0100650 A1 | 5/2007 | Ramer et al. |
| 2007/0186106 A1 | 8/2007 | Ting |
| 2007/0198346 A1 | 8/2007 | Beyda et al. |
| 2007/0250920 A1 | 10/2007 | Lindsay |
| 2007/0271379 A1 | 11/2007 | Carlton et al. |
| 2007/0281689 A1 | 12/2007 | Altman |
| 2008/0065505 A1 | 3/2008 | Plastina |
| 2008/0125116 A1* | 5/2008 | Jiang .................. H04W 8/06 455/433 |
| 2008/0133336 A1 | 6/2008 | Altman et al. |
| 2008/0162346 A1* | 7/2008 | Aaron .................. G06Q 20/24 705/44 |
| 2008/0165060 A1 | 7/2008 | Songer et al. |
| 2008/0172340 A1 | 7/2008 | Karlsson |
| 2008/0207220 A1* | 8/2008 | Aaron .................. H04W 12/12 455/456.1 |
| 2008/0261565 A1 | 10/2008 | Kunz |
| 2009/0061860 A1* | 3/2009 | Jiang .................. H04M 3/2281 455/433 |
| 2009/0265543 A1* | 10/2009 | Khetawat ............. H04L 63/104 713/151 |
| 2010/0130165 A1 | 5/2010 | Snyder et al. |
| 2012/0122451 A1* | 5/2012 | Jiang .................. H04W 8/06 455/433 |
| 2012/0231777 A1* | 9/2012 | Lewis .................. G06F 8/65 455/418 |
| 2012/0302209 A1* | 11/2012 | Snyder .................. G06F 21/88 455/410 |
| 2012/0310836 A1* | 12/2012 | Eden .................. G06Q 20/04 705/44 |
| 2014/0316984 A1 | 10/2014 | Schwartz |
| 2014/0351899 A1* | 11/2014 | Dennis .................. H04W 12/06 726/4 |
| 2014/0357222 A1* | 12/2014 | Mohammed ......... H04M 15/70 455/406 |
| 2015/0142623 A1 | 5/2015 | Ferguson et al. |

FOREIGN PATENT DOCUMENTS

| | | |
|---|---|---|
| EP | 2417755 | 2/2012 |
| EP | 2417755 | 3/2019 |
| WO | 96/41488 A2 | 12/1996 |
| WO | 00/67168 A2 | 11/2000 |
| WO | 2004/079499 A2 | 9/2004 |
| WO | 2007/004224 A1 | 1/2007 |
| WO | 2007/019599 A1 | 2/2007 |
| WO | 2010118057 | 10/2010 |

OTHER PUBLICATIONS

U.S. Appl. No. 12/628,051, "Supplemental Notice of Allowability", dated Aug. 2, 2012, 10 pages.
U.S. Appl. No. 13/567,468, "Final Office Action", dated Aug. 19, 2013, 21 pages.
U.S. Appl. No. 13/567,468, "Non-Final Office Action", dated Dec. 7, 2012, 18 pages.
U.S. Appl. No. 13/567,468, "Notice of Allowance", dated May 27, 2014, 9 pages.
U.S. Appl. No. 14/446,626, "Final Office Action", dated May 12, 2016, 23 pages.
U.S. Appl. No. 14/446,626, "Non-Final Office Action", dated Nov. 5, 2015, 38 pages.
U.S. Appl. No. 14/446,626, "Notice of Allowance", dated Nov. 9, 2016, 14 pages.
U.S. Appl. No. 14/594,822, "Final Office Action", dated Jan. 22, 2018, 17 pages.
U.S. Appl. No. 14/594,822, "Non-Final Office Action", dated Jul. 26, 2017, 14 pages.
CA2,794,585, "Office Action", dated Jul. 14, 2016, 4 pages.
CA2,794,585, "Office Action", dated Jun. 13, 2017, 4 pages.
EP10762323.3, "Extended European Search Report", dated Mar. 7, 2017, 9 pages.
PCT/US2010/030132, "International Preliminary Report on Patentability", dated Oct. 20, 2011, 11 pages.
Mobile Location Protocol V3.2, Open Mobile Alliance Ltd, Nov. 24, 2005, 130 pages.
Williams et al., "The Definitive Guide to: Mobile Positioning & Location Management," copyright 2005 Mind Commerce, 191 pages.
Snyder et al., Wireless Telecommunications Networking with ANSI-41, 2D. Ed., pp. 12-14,45, 84-85, McGraw-Hill Companies, New York, NY, 2001.
International Search Report and Written Opinion dated Jun. 17, 2010 for PCT Patent Application No. PCT/US2010/030132, 11 pages.
Final Office Action dated Nov. 14, 2016 in re U.S. Appl. No. 13/387,991, filed Jan. 30, 2012, 20 pgs.
Non-Final Office Action dated Jan. 27, 2017 in re U.S. Appl. No. 14/922,727, filed Oct. 26, 2015. 37 pgs.
U.S. Appl. No. 14/594,822, "Non-Final Office Action", dated Oct. 10, 2018, 16 pages.
U.S. Appl. No. 14/594,822, "Final Office Action", dated Apr. 1, 2019, 15 pages.

* cited by examiner

| Wireless Device ID (MDN) ~502 | Location Data ~504 | Subscriber Data ~506 | Wireless Location Date:Time ~508 | Application ID ~510 | Pattern Value ~512 | Historical Pattern Values ~514 |
|---|---|---|---|---|---|---|
| +1-702-555-0000 | LAC, Age of LAC | Pre-Paid, Carrier X | 09-26-2008: 12:34:56 | Application 1<br>Event 1\|Location\|Date:Time<br>Event n\|Location\|Date:Time<br>Application n<br>Event 1\|Location\|Date:Time<br>Event n\|Location\|Date:Time | 903 | Date:Time 842<br>Date:Time 765<br>Date:Time 518<br>Date:Time 822<br>Date:Time 119<br>... |
| +1-702-555-1234 | MSCID, MCC, MNC, NDC | Wireless Device Mfr & Model | 09-27-2008: 22:45:07 | Application 1<br>Event 1\|Location\|Date:Time<br>Event n\|Location\|Date:Time<br>Application n<br>Event 1\|Location\|Date:Time<br>Event n\|Location\|Date:Time | 684 | Date:Time 684<br>Date:Time 684<br>Date:Time 532<br>Date:Time 986<br>Date:Time 433<br>... |
| +1-206-555-1111 | Subscriber State, CID | Age of Subscription, Post-Paid, Carrier Y | 09-26-2008: 16:34:56 | Application 1<br>Event 1\|Location\|Date:Time<br>Event n\|Location\|Date:Time<br>Application n<br>Event 1\|Location\|Date:Time<br>Event n\|Location\|Date:Time | 312 | Date:Time 203<br>Date:Time 453<br>Date:Time 467<br>Date:Time 502<br>Date:Time 384<br>... |
| +1-425-555-0000 | MSCID, Subscriber State | Age of Subscription, Pre-Paid, Carrier Z | 09-26-2008: 09:11:49 | Application 1<br>Event 1\|Location\|Date:Time<br>Event n\|Location\|Date:Time<br>Application n<br>Event 1\|Location\|Date:Time<br>Event n\|Location\|Date:Time | 496 | Date:Time 500<br>Date:Time 500<br>Date:Time 438<br>Date:Time 526<br>Date:Time 515<br>... |
| ... | ... | ... | ... | ... | ... | ... |

*FIG. 5*     EXEMPLARY WIRELESS DEVICE ID DATABASE

| Wireless Device ID (MDN) | Address 1 | Address 2 | Phone 1 | Phone 2 | Related Locations | | Related Entries (related Wireless Device IDs) |
|---|---|---|---|---|---|---|---|
| +1-702-555-0000 | Address, City, State, Postal Code, Country | Address, City, State, Postal Code, Country | CC-NDC-SN | CC-NDC-SN | Loc 1 / Loc 3 | Loc 2 / Loc n | CC-NDC-SN |
| +1-702-555-1234 | Address, City, State, Postal Code, Country | Address, City, State, Postal Code, Country | CC-NDC-SN | CC-NDC-SN | Loc 1 / Loc 3 | Loc 2 / Loc n | CC-NDC-SN |
| +1-206-555-1111 | Address, City, State, Postal Code, Country | Address, City, State, Postal Code, Country | CC-NDC-SN | CC-NDC-SN | Loc 1 / Loc 3 | Loc 2 / Loc n | CC-NDC-SN |
| +1-425-555-0000 | Address, City, State, Postal Code, Country | Address, City, State, Postal Code, Country | CC-NDC-SN | CC-NDC-SN | Loc 1 / Loc 3 | Loc 2 / Loc n | CC-NDC-SN |
| ... | ... | ... | ... | ... | ... | ... | ... |

EXEMPLARY LOCATION PATTERN DATABASE

*FIG. 6*

| Application ID | Location Pattern Data | | Logic Resource |
|---|---|---|---|
| | Location | Weighting Factor | |
| Application 1 | MSCID / CID / MCC / MNC / NDC / State | Value 1 / Value 2 / Value 3 / Value 4 / Value 5 / Value n | Location Recognition Logic Resource W |
| Event 1 — Weighting Factor | | | |
| Event n — Weighting Factor | | | |
| Application 2 | MSCID / CID / MCC / MNC / NDC / State | Value 1 / Value 2 / Value 3 / Value 4 / Value 5 / Value n | Location Recognition Logic Resource X |
| Event 1 — Weighting Factor | | | |
| Event n — Weighting Factor | | | |
| Application 3 | MSCID / CID / MCC / MNC / NDC / State | Value 1 / Value 2 / Value 3 / Value 4 / Value 5 / Value n | Location Recognition Logic Resource Y |
| Event 1 — Weighting Factor | | | |
| Event n — Weighting Factor | | | |
| Application n | MSCID / CID / MCC / MNC / NDC / State | Value 1 / Value 2 / Value 3 / Value 4 / Value 5 / Value n | Location Recognition Logic Resource Z |
| Event 1 — Weighting Factor | | | |
| Event n — Weighting Factor | | | |

*FIG. 7*    EXEMPLARY LOGIC RESOURCE CONFIGURATION DATA

SYSTEM AND METHOD FOR IDENTITY PROTECTION USING MOBILE DEVICE SIGNALING NETWORK DERIVED LOCATION PATTERN RECOGNITION

CROSS REFERENCE RELATED APPLICATIONS

This patent application is a continuation of U.S. application Ser. No. 14/446,626 filed on Jul. 30, 2014 which is a continuation of U.S. application Ser. No. 13/567,468 filed on Aug. 6, 2012 now U.S. Pat. No. 8,831,564, issued Sep. 9, 2014, which is a continuation of U.S. application Ser. No. 12/628,051 filed on Nov. 30, 2009 now U.S. Pat. No. 8,280,348 issued on Oct. 2, 2012 which claims the benefit of U.S. Provisional Patent Application No. 61/167,111 filed Apr. 6, 2009, the contents of each of which are hereby incorporated by reference in their entirety.

This patent application is a continuation-in-part, and claims the benefit of the filing date, of U.S. patent application Ser. No. 14/054,047 filed on Oct. 15, 2013 which is a continuation of U.S. patent application Ser. No. 13/303,809 filed on Nov. 23, 2011 now U.S. Pat. No. 8,588,748 issued on Nov. 19, 2013 which is a continuation of U.S. patent application Ser. No. 12/332,878, filed Dec. 11, 2008, now U.S. Pat. No. 8,116,731 issued on Feb. 14, 2012 which claims the benefit of U.S. Provisional Application No. 61/058,621, filed Jun. 4, 2008, and also claims the benefit of U.S. Provisional Application No. 61/027,892, filed Feb. 2, 2008.

This patent application is a continuation-in-part, and claims the benefit of the filing date, of U.S. patent application Ser. No. 14/196,861 filed on Mar. 4, 2014 which is a continuation of U.S. application Ser. No. 11/933,803, filed Nov. 1, 2007, now U.S. Pat. No. 8,374,634 issued on Feb. 12, 2013 which claims the benefit of U.S. Provisional Application No. 60/979,663, filed Oct. 12, 2007; U.S. Provisional Application No. 60/909,718, filed Apr. 3, 2007; and U.S. Provisional Application Ser. No. 60/895,144, filed Mar. 16, 2007.

This patent application is a continuation-in-part, and claims the benefit of the filing date, of U.S. patent application Ser. No. 12/992,064 file on Feb. 9, 2011, which is a 371 National Stage entry of Patent Cooperation Treaty application No. PCT/US2009/03007 filed on May 13, 2009 which claims the benefit of U.S. Provisional Application No. 61/053,152, filed May 14, 2008.

This patent application is a continuation-in-part, and claims the benefit of the filing date, of U.S. patent application Ser. No. 13/030,759 filed on Feb. 18, 2011, which claims the benefit of Provisional Application No. 61/305,830, filed Feb. 18, 2010.

This patent application is a continuation-in-part, and claims the benefit of the filing date, of U.S. patent application Ser. No. 13/030,794 filed on Feb. 18, 2011, which claims the benefit of U.S. Provisional Application No. 61/306,369, filed Feb. 19, 2010.

This patent application is a continuation-in-part, and claims the benefit of the filing dates of U.S. patent application Ser. No. 13/382,900 filed on Jan. 6, 2012, which is a 371 National Stage entry of Patent Cooperation Treaty application No. PCT/US2010/41264 filed on Jul. 7, 2010 which claims the benefit of U.S. Provisional Application No. 61/223,671 filed Jul. 7, 2009 and Provisional Application No. 61/223,677, filed Jul. 7, 2009.

This patent application is a continuation-in-part, and claims the benefit of the filing date, of U.S. patent application Ser. No. 13/387,991 filed on Jan. 30, 2012, which is a 371 National Stage entry of Patent Cooperation Treaty application No. PCT/US2010/44019 filed on Jul. 30, 2010 which claims the benefit of U.S. Provisional Application No. 61/230,628, filed Jul. 31, 2009.

This patent application is a continuation-in-part, and claims the benefit of the filing date, of U.S. patent application Ser. No. 13/752,271 filed Jan. 28, 2013, which claims the benefit of U.S. Provisional Application No. 61/591,232, filed Jan. 26, 2012.

This patent application is a continuation-in-part, and claims the benefit of the filing date, of U.S. patent application Ser. No. 13/903,663 filed on May 28, 2013, which claims the benefit of U.S. Provisional Application No. 61/659,934, filed Jun. 14, 2012 and U.S. Provisional Application No. 61/652,173, filed May 26, 2012.

The contents of each of the foregoing applications are hereby incorporated by reference in their entirety.

BACKGROUND OF THE INVENTION

Signaling is the process of sending signals or signaling information. It is the transfer of special information to control communication. Signaling consists of a protocol or a specialized set of rules that govern the communications of a system. The protocol enables the effective use of the control information (i.e. signals) to provide meaningful communications within a network. Signaling is the mechanism used to operate, control, and manage, the wireless telecommunications network. A good example of a signal is the common ringing alert signal that we are familiar with when someone is calling a telephone. It is distinguished from the user information provided by the telephone network (i.e. voice) since it provides an indication that a party is calling, but it is not the information that is meant to be conveyed by the caller.

Signaling and signaling protocols have become very complex, especially when used to govern telecommunications and the sophisticated services provided today. These advanced signaling protocols provide for the transfer of information among network nodes that enables what is known as intelligent networking. Intelligent networking is a method for providing and interpreting information within a distributed network. A distributed network is structured such that the network resources are distributed throughout the geographic area being served by the network. The network is considered to be intelligent if the service logic and functionality can occur at the distributed nodes in the network. The mobile telecommunications network is distributed and intelligent. Because intelligent networks require such sophisticated signaling, the signaling means has evolved from electrical pulses and tones into very complex messaging protocols. Network signaling is used between network nodes to operate, manage, and control the network to support certain types of functionality.

Signaling information consists of messages that contain parameters that support many functions throughout a network. The primary function required for mobile and cellular-based telecommunications and data networks is mobility and location management. These management functions are key to enabling subscriber mobility in mobile and cellular-based wireless networks. Signaling is provided among mobile switching centers (MSCs), location registers, network gateways and some specialized processing centers to support subscriber mobility within as well as between many different wireless service provider networks.

The primary identifying characteristic of a particular wireless device is the dialable mobile directory number (MDN). The MDN can be up to 15 digits long and is a unique number worldwide among all wireless devices, regardless of country or telecommunications network operator. The format of the MDN has been standardized as the E.164 International Public Telecommunication Number by the International Telecommunications Union, a standards making organization within the United Nations. Because the MDN is unique worldwide to an entity's or individual's mobile service subscription and wireless device, it can be considered an extension of the unique identity of that wireless device's user.

Much of the utility of using an entity's or individual's wireless device as an extension of the identity of the user is enabled by the physical security of wireless devices. Wireless devices are inherently secure due to the properties of digital cellular telecommunications. Digital cellular technology has replaced analog cellular technology worldwide. With this advancement came cellular authentication. Cellular authentication uses a cryptographic security protocol and public key infrastructure that is only made possible by digital communications technology. This cryptographic security protocol prevents a mobile directory number from being used by any wireless device other than the one for which it was originally programmed. The only way to re-use a mobile directory number with another device is by special secure provisioning performed within secure network platforms by the wireless network operator. When this secure provisioning occurs, the mobile director number is securely and solely associated with the device for which it is used. In the case of GSM networks, the secure wireless device is the subscriber identity module, or SIM card, which is associated with an individual and unique mobile service subscription. This is why a SIM card can be used in any GSM-based mobile phone without notifying the wireless network operator. In the case of CDMA networks, the wireless device is the mobile phone itself as SIM cards are not commercially supported today.

SUMMARY OF THE INVENTION

An object of an embodiment of the present invention is to provide a system, and its methods of use, to detect patterns in locations derived from a communications signaling network 102 and pertaining to particular wireless devices associated with unique wireless device identifiers, for example mobile directory numbers (MDNs). The invention relates generally to protecting identity by obtaining wireless device location data from a wireless communications signaling network such as a Signaling System No. 7 (SS7) network and the associated mobile application part (MAP) protocol that makes use of the SS7 protocol and networks. The MAP protocol is used to enable mobility and location management of wireless devices and provides for automatic roaming, cellular handoff and a variety of other commonly used wireless telecommunications features. By using signaling operations and messages supported by wireless or cellular networks, wireless device location and other data may be derived. This data may be used as the basis for statistical analysis that can reveal patterns of location for both individual wireless devices as well as an aggregation of wireless device. The statistical analysis of these locations can then be used for a variety of applications, such as revealing patterns that assist in the detection and prevention of fraudulent behavior or activity that may be engaged in by a purported wireless device user.

Another object of an embodiment of the present invention is to provide a system, and its methods of use, to detect patterns of device behavior associated with the use of a particular wireless device identified, for example, by an MDN and the use of the particular MDN over time. This data may be obtained from a signaling, data or other communications network associated with one or more wireless networks that may serve, or have served, the MDN. This data may be used as the basis for statistical analysis that can reveal patterns of use for both individual wireless devices as well as an aggregation of wireless devices. The statistical analysis of these patterns of use can then be used for a variety of applications, such as revealing patterns that assist in the detection and prevention of fraudulent behavior or activity that may be engaged in by a purported wireless device user.

Yet another object of an embodiment of the present invention is to provide a system, and its method of use, for detecting, identity theft based on analysis of a multiplicity of provided and stored parameters associated with derived locations, historical locations, derived data about an MDN, historical use of a particular MDN, and historical patterns of locations and use of MDNs.

A further exemplary embodiment of the present invention applies to and has utility for detecting and preventing identity theft. Identity theft occurs, for example, when an individual's identity credentials are compromised, or otherwise stolen, by perpetrators of fraud. These perpetrators use the identity credentials of individual victims to obtain some financial or other benefit at a cost to the victim.

By recognizing patterns of the locations of individual's wireless devices, statistical models can be derived and used to determine a probability that a purported wireless device user is engaged in either some usual and regular behavior or potentially irregular or anomalous behavior. Irregular or anomalous behavior may be an indication that identity theft has occurred and probabilistic techniques and models to determine incidents of identity theft may be created to detect, with some degree of accuracy, that identity theft has in fact occurred.

These and other examples of the invention are described in further detail below.

BRIEF DESCRIPTION OF THE DRAWING

Preferred and alternative examples of the present invention are described in detail below with reference to the following drawings:

FIG. 5 depicts an exemplary Wireless Device ID Database used to associate unique Wireless Device IDs (e.g. MDNs) with Signaling Network Derived Location Data, network derived Subscriber Data, applications for the data and Pattern values.

FIG. 6 depicts au exemplary Location Pattern Database used to store unique Wireless Device IDs (e.g. MDNs) associated with other data associated with a user of the particular MDN.

FIG. 7 depicts exemplary Logic Resource Configuration Data used by or associated with, one or more Location Recognition Logic Resources.

DETAILED DESCRIPTION OF PREFERRED EMBODIMENT

Figure 1:
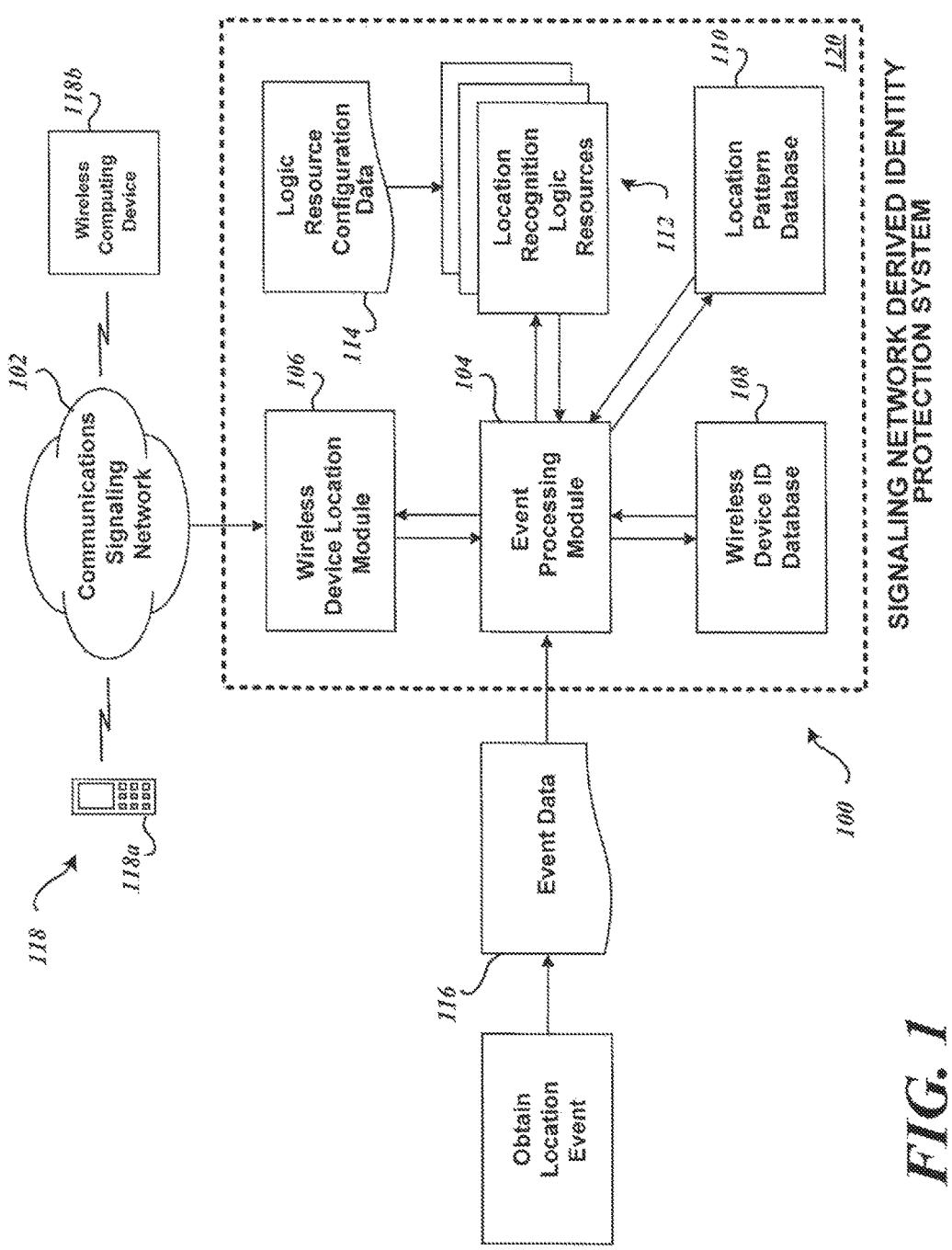
FIG. 1 depicts the functional entities and modules of an exemplary Signaling Network Derived Identity Protection System formed in accordance with an embodiment of the present invention. Included in the example is an Event Processing Module, a Wireless Device Location Module, a Wireless Device Database, a Location Pattern Database, one or more Location Recognition Logic Resources and Logic Resource Configuration Data in accordance with the principles of the present invention.

FIG. 1 depicts the functional entities and modules of an exemplary Signaling Network Derived Identity Protection System 100. FIG. 1 shows a block diagram of a system for Signaling Network Derived location pattern recognition. (The System 100 may also be referred to as a Signaling Network Derived Location Pattern Recognition System.) Embodiments of the Signaling Network Derived Identity Protection System 100, based upon information received from a signaling network 102, and optionally other information, assess the likelihood that an electronic activity of interest is fraudulent.

Examples of electronic activities include a purchase of a product or service using a credit card or the like, where the product or service is purchased by an individual at a particular location (point of purchase) or at a remote location (such as a "mail order" purchase or purchase of rights to access an interact site). Another example of an electronic activity is use of a debit card or credit card to obtain cash from an automatic teller machine (ATM). Another example is use of an identity card, such as a drivers license or passport, to prove identity of an individual. Yet another example includes remote access to a secure internet site, wherein the remote access requires identity validation as part of an access process. It is appreciated that embodiments of the Signaling Network Derived identity Protection System 100 may be configured to provide an assessment of the likelihood of fraud for any type of electronic activity.

Included in the example an exemplary Signaling Network Derived Identity Protection System 100 used to determine and recognize patterns for wireless device location derived from a communications signaling network 192. The example depicts an Event Processing Module 194, a Wireless Device Location Module 106, a Wireless Device ID Database 108, a Location Pattern Database 110, one or more Location Recognition Logic Resources 112, and Logic Resource Configuration Data 114 in accordance with the principles of the present invention.

The Wireless Device Location Module 106 supports signaling network operations and messages of the Signaling Network Derived identity Protection System 100 to request wireless device location data from the communications signaling network 102.

The Event Processing Module 104 obtains Event Data 116 emanating from some Location Event that may be associated with some application. The Event Processing Module 104 also obtains Mobile Directory Number (MDN) data associated with a Location Event that may or may not have been previously registered in the Wireless Device ID Database 108. The Event Processing Module 104 passes the Event Data 116 to the Wireless Device ID Database 108 for storage and use for location data pattern recognition. The Event Processing Module 104 passes an entity's or individual's unique Wireless Device ID (e.g. the MDN) associated with the Event Data 116 to the Wireless Device Location Module 106 that is used to obtain the location of a wireless device 118, such as a mobile telephone 118a or Wireless Computing Device 118b from the communications signaling network 102. The Wireless Device Location Module 106 passes the obtained wireless device location associated with the Wireless Device ID to the Wireless Device ID Database 108 directly or indirectly via the Event Processing Module 104. The Event Processing Module 104, the Wireless Device ID Database 108 and the Location Pattern Database 110 provide the appropriate data and parameters associated with the Wireless Device ID to the Location Recognition Logic Resources 112 to determine a pattern of geographic behavior for one or more individuals represented by the MDN. The data may be provided directly to one or more Location Recognition Logic Resources 112 by the respective databases, or via the Event Processing Module 104. One or more Location Recognition Logic Resources 112 may use configuration data supplied by the Logic Resource Configuration 114 to properly calculate and/or otherwise reveal location patterns. Once the location patterns are calculated or otherwise revealed, they may be stored in the Location Pattern Database 110. These location patterns may subsequently be accessed and used in statistical and probabilistic algorithms or calculations for utility, for example, in determining patterns of fraudulent behavior or activities.

It should be understood that the Signaling Network Derived Identity Protection System 100 shown in FIG. 1 can be implemented using a computer system 120 having at least one processor, at least one memory component in signal communication with the processor, and at least one communications interface in signal communication with the processor. The Wireless Device ID Database 108, the Location Pattern Database 110, the Location Recognition Logic Resources 112, and the Logic Resource Configuration Data 114 can be stored in the memory, for example. Programming instructions can also be stored in memory that when run by the processor cause the processor to be configured to implement the functions of the Event Processing Module 104 and the Wireless Device Location Module 106. In some embodiments, the Event Processing Module 104 and the Wireless Device Location Module 106 can be implemented with different processors. The communications interface can allow the processor to communicate with the communications signaling network 102 when running the processes of the Wireless Device Location Module 106. The communications interface can also allow the processor to receive Event Data 116 from a Location Event and to send location pattern results to other systems. The results can be sent to systems that triggered a Location Event or to other systems. In some embodiments, more than one communications interface can be used. It should also be understood that the Signaling Network Derived Identity Protection System 100 can be implemented in a distributed manner using a plurality of computer systems 120.

Generally, the Signaling Network Derived Identity Protection System 100 is used in a process of authenticating an electronic activity of interest where one or more locations of a user of the wireless device 118 that are derived from the communications signaling network 102 are incorporated into the Logic Resources 112 to generate a value (i.e. a Pattern value), to assist in creating a statistical model that can determine a likelihood that the automated electronic activity, such as a particular transaction engaged in, is fraudulent. The Signaling Network Derived Identity Protection System 100 can be used with any type of electronic activity, such as an automated transaction. Two non-limiting example types of electronic activities of interest are card-not-present (CNP) and card present (CP) financial transactions.

The Location Event can be triggered by various types of applications. For example in a first alternate embodiment, a consumer desiring to make a purchase when they are not present at a retailer can initiate a card-not-present (CNP) transaction by using a computer network such as the Internet. The consumer can enter payment information such as a credit card number, the consumer's MDN and the consumer's name and address using an input device in signal communication with a computer used by the consumer. The payment information can then be transmitted to a computerized payment processing system of a payment processor such as a bank. The payment processing system can generate a Location Event by sending Event Data 116 that includes the consumer's MDN to the Signaling Network Derived Identity Protection System 100. The Signaling Network Derived Identity Protection System 100 receives the Event Data 116 through the communications interface. A processor configured to implement the functions of the Event Processing Module 104 and the Wireless Device Location Module 106 requests information pertaining to, such as the location of, a device associated with the consumer's MDN from the communications signaling network 102. The processor generates location pattern information based on at least one of the Logic Resource Configuration 114, Location Recognition Logic Resources 112, Location Pattern Database 110, and Wireless Device ID Database 108. The processor then sends a response based on the location pattern information back to the payment processing system. The payment processing system, based upon the received information provided by the Signaling Network Derived Identity Protection System 100, generates an acceptance decision based on the response and, in some cases, other predetermined criteria. If the acceptance decision is positive, the payment processing system allows the transaction to proceed and the consumer is notified that the transaction went through, such as by displaying a confirmation number or a display device in signal communication with the computer used by the consumer. If the acceptance decision is negative, the payment processing system does not allow the transaction to proceed and notifies the consumer in a similar manner.

Other alternate example embodiments have other sources of Location Events such as being generated by a card present transaction or being generated during an access process by a software application sending consumer information such as an MDN to the Signaling Network Derived Identity Protection. System 100 so that the transaction or access procedure is authenticated based on information in a response from the Signaling Network Derived Identity Protection System 100. The transaction authentication process includes providing information that is used for denying or allowing a purchase at a point of sale such as by displaying an accepted or denied message, for example.

As another example of an electronic activity, an access procedure authentication process may include providing information that is used for allowing or denying the consumer access to a software application, such as when the consumer initiates access to the software application. The software application responds by displaying a denial message (if the embodiment provides information indicating a relatively high likelihood of fraudulent access) or by displaying an application entry screen (if the embodiment provides information indicating a relatively high likelihood of valid access).

As yet another example, an individual may be passing through a check point or gate, entering into or exiting a building or the like, wherein a proof of identity is required. When electronic security is used for identity verification, and/or when an identification document is used for identity verification, embodiments of the Signaling Network Derived Identity Protection System 100 may be used to assess the likelihood that the individual is fraudulently attempting to gain access through the check point or gate, or is fraudulently attempting to gain entry into or exit from the building or the like.

Embodiments of the Signaling Network Derived Identity Protection System 100 may be used to assess the likelihood of fraud of the electronic activity before the electronic activity is underway, while the electronic activity is underway, and/or assess after the electronic activity has been concluded. For example, pre-authorization may be used to verify identity of the purchaser prior to delivery of a goods or service to the purchaser. If the electronic activity pertains to a point of purchase transaction, a prior transaction approval process could be completed before the purchaser leaves the premises. As another non-limiting example, if the electronic activity pertains to an Internet purchase transaction, the transaction approval could be completed before the purchased goods are mailed to the purchaser.

In the various embodiments of the Signaling Network Derived Identity Protection System 100, the likelihood of fraud of a particular electronic activity of interest is assessed in response to receiving a request from a transaction entity that is conducting, or is associated with, the electronic activity of interest. Non-limiting examples of transaction entities include banks, credit card companies, Internet service providers, and sellers of goods and/or services.

Figure 2:
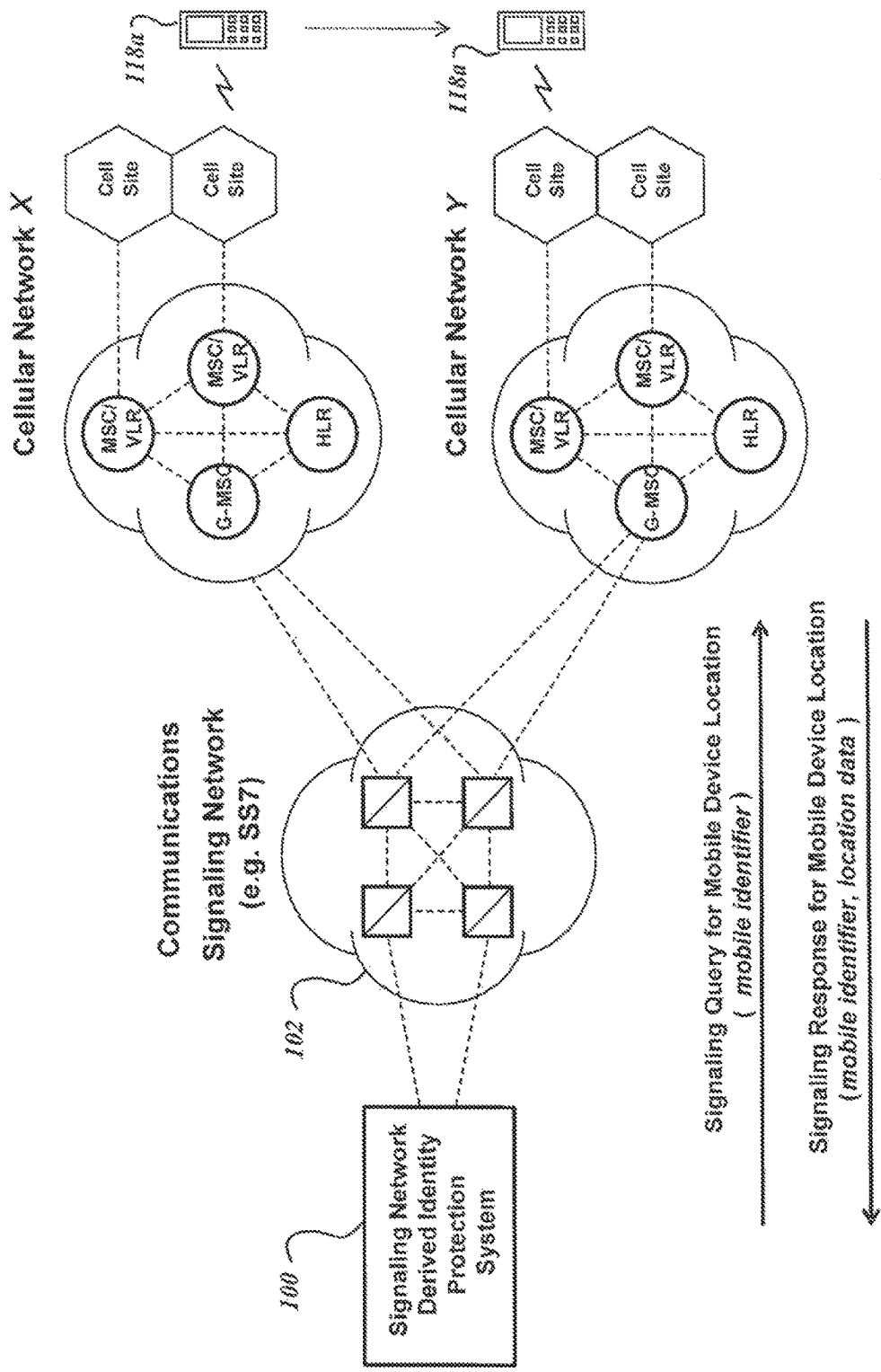
FIG. 2 depicts an exemplary block diagram depicting the functional entities and modules of cellular-based networks being accessed by a Signaling Network Derived Identity Protection System in accordance with an embodiment of the present invention.

FIG. 2 depicts the functional entities and modules of the exemplary Signaling Network Derived Identity Protection System 100 requesting wireless device location data via the communications signaling network 102. FIG. 2 shows an example signaling network location query, and response. The example depicts cellular Networks X and Y, currently serving wireless devices 118, that provide wireless device location data to the Signaling Network Derived Identity Protection System 100 that may be used to determine and reveal wireless device location patterns. The location data obtained may or may not be the same location data used by cellular networks to support mobility management functions such as roaming, handoff, etc. The Signaling Network Derived identity Protection System 100 leverages, for example, the SS7 network, which is considered an Intelligent Network (IN), which includes the procedures used to enable wireless device users to communicate while mobile.

The communications signaling network 102 supports the Mobile Application Part (MAP) and other protocols as the main enabler of mobility management functions. For GSM-based cellular networks, GSM MAP may be used. GSM MAP supports a variety of operations and signaling messages used to provide mobility management. Non-limiting examples are:

Any-Time-Interrogation (ATI) MAP operation using a Mobile Station International Subscriber Directory Number (MSISDN) to retrieve location data from the subscriber's Home Location Register (HLR). ATI is a signaling message developed for CAMEL phase 1 (Customized Application for Mobile network Enhanced Logic). It is used for communication between a Signaling Point and the where subscriber data is stored. The MSISDN performs as the MDN of the wireless device 118.

Provide-Subscriber-Location MAP operation message using MSISDN to retrieve location data from the subscriber's serving MSC/VLR.

Location-Update MAP operation message using MSISDN or International Mobile Subscriber Identity (IMSI) to retrieve location data from the subscriber's Home Location Register (HLR).

Set-Routing-Information MAP operation message using MSISDN or IMSI to retrieve location data from the subscriber's Home HLR.

SMS Type 0 message using MSISDN to retrieve location data from the subscriber's serving network.

For CDMA/ANSI-41-based cellular networks, ANSI-41 MAP may be used. ANSI-41 MAP supports a variety of operations and signaling messages used to provide mobility management. Non-limiting examples are:

Location-Request MAP operation using the MIN performing the MDN to retrieve location data from the subscriber's Home Location Register (HLR). Location-Request is a signaling message used for communication between a Signaling Point and the HLR, where subscriber data is stored. The MIN is essentially the MDN of the wireless device 118.

Position-Request MAP operation using MIN to retrieve location data from the subscriber's Home Location Register (HLR).

Qualification-Request MAP operation using MIN to retrieve location data from the subscriber's Home Location Register (HLR).

Some networks support mobility of wireless devices 118 between cellular networks and Wi-Fi networks. These networks use technology known as Unlicensed Mobile Access (UMA) that has been developed to provide seamless handoff, switching and network functionality between cellular and Wi-Fi point-to-point communications networks. In some cellular networks there exists a network entity supporting this seamless movement between wireless access protocols called the UMA Network Controller (UNC) which acts as a gateway for MAP and SS7 signaling messages that move between IP-based networks and SS7 networks. When a wireless device 118 accesses a Wi-Fi base station, it seamlessly hands off the communication through the UMA Network Controller Gateway. When the communication is IP-based, an MSC global title address representing the UNC gateway as opposed to the normal cellular MSC gateway may be provided.

Location results obtained by the Signaling Network Derived identity Protection System 100 via the communications signaling network 102 may consist of one or more of the following Location Data parameters:

Age of location since the last Visitor Location Register (VLR) update

Location Area—A location area is the area associated with a VLR. In networks where there is a one-to-one mapping between MSCs and VLRs, the location area corresponds to the area controlled by one MSC. When the wireless device's location area changes, the wireless device 118 needs to perform a location update operation to register its presence in the new VLR and erase its presence in the old VLR. In this case, the HLR also needs to be updated. If the wireless device 118 is engaged in communication, a handoff must be performed between the different MCs.

Mobile Country Code (MCC)

Mobile Network Code (MNC)

Cell identity (e.g. in longitude and latitude or other location context)

Subscriber State (on or off)

International Mobile Equipment Identity (IMEI)

Gateway MSC Global Title (GT) Address—serving VLR (e.g. E.164 network address). The Gateway MSC is an MSC with an interface to other networks. Mobile network operators may deploy all of their MSCs with gateway functionality or only a few. The MSC GT address may provide the following location based data:

Wireless Device 118 in home network

Wireless Device 118 in visited network

Country Code (CC)

National Destination Code (NDC)

Furthermore, additional Subscriber Data associated with a particular MDN may be obtained via a communications network that may consist of one or more of the following parameters associated with the MDN:

Network operator currently serving the MDN

Age of network subscription with current network operator

Age of MDN association with current entity

Network Operators previously associated with or have served the MDN

Type of network subscription (e.g. pre-paid or post-paid)

Type of network device (e.g. manufacturer and model)

Figure 3:
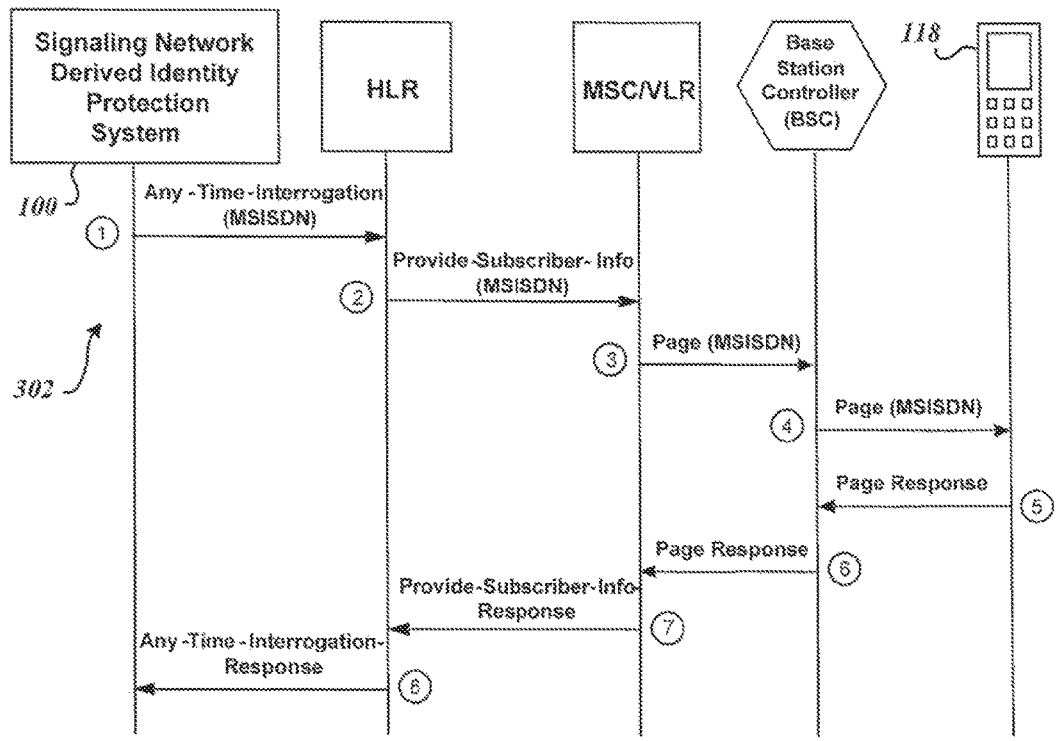
FIG. 3 depicts an exemplary flow diagram depicting operational message flow in a GSM CAMEL-based cellular network using an Any-Time-Interrogation (ATI) message to obtain location data for a wireless device performed using the Signaling Network Derived Identity Protection System.

FIG. 3 depicts an operational message flow 302 in a GSM CAMEL-based cellular network using an Any-Time-Interrogation (ATI) message to obtain location data for the wireless device 118. The example depicts signaling message flow between the SS7 Signaling Network Derived Identity Protection System 100 and a cellular network to obtain location data (e.g. using GSM).

Initially, at step 1, the Network Derived Identity Protection System communicates an any-time-interrogation to the HLR, such as via an MSISDN. The HLR provides various signaling system information. Then, at step 2, communicates a provide-subscriber-information message to the MSC and/or the VLR (MSC/VLR). The VLR and/or MSC provides various additional signaling system information. At step 3, a page is communicated to the base station controller (BSC). At step 4, the page is forwarded from the BSC to the wireless device 118, and a response to the page is provided at step 5. At step 6, the page response is forwarded from the BSC to the MSC/VLR. At step 7, the MSC/VLR provides a subscriber-information-response to the HLR. The HLR then returns an any-time-interrogation-response to the Network Derived Identity Protection System 100. Accordingly, the Network Derived Identity Protection System 100 has obtained information about the wireless device 118 from the communications signaling network 102.

Figure 4:
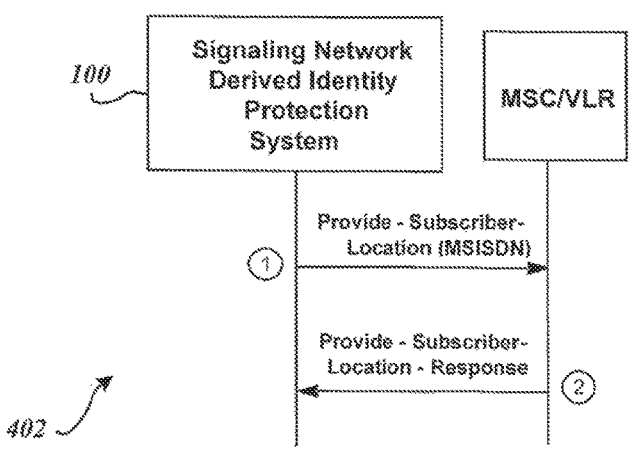
FIG. 4 depicts an exemplary flow diagram depicting operational message flow in a GSM-based cellular network using the Provide-Subscriber-Location message to obtain location data for a wireless device performed using the Signaling Network Derived Identity Protection System.

FIG. 4 depicts an operational message flows 402 in a GSM-based cellular network using a Provide-Subscriber- Location message to obtain location data for the wireless device 118. The example depicts signaling message flow between the SS7 Signaling Network Derived Identity Protection System 100 and a cellular network to obtain location data (e.g. using GSM).

At step 1, the Network Derived Identity Protection System 100 communicates a provide-subscriber-location message to the MSC and/or the VLR (MSC/VLR). The VLR and/or MSC provides various additional signaling system information. At step 2, the MSC/VLR provides a subscriber-location-response to the to the Network Derived Identity Protection System 100. Accordingly, the Network Derived identity Protection System 100 has obtained information about the wireless device 118 from the communications signaling network 102.

The above-described processes of FIG. 3 and FIG. 4 are simplified to illustrate a process of obtaining information about the wireless device 118. Other embodiments may use fewer steps, more steps, or steps performed in a different order, when information about the wireless device 118 is obtained from the communications signaling network 102.

FIG. 5 depicts exemplary entries in the exemplary Wireless Device ID Database 108 (FIG. 1). In particular a first entry includes an association among a Wireless Device ID 502 (e.g. in this case an MDN), Signaling Network Derived Location Data 504, network derived Subscriber Data 506, Location Date and Time 508 associated with the derived Location Data 504, an Application ID representing the relevant application requiring a location recognition Pattern value, a Pattern value and Historical Pattern values 514. The Wireless Device ID 502 is used by the Wireless Device Location Module 106 in FIG. 1 to either request the Location Data 504 from the communications signaling network 102 or autonomously receive the Location Data 504 from the communications signaling network 102. The obtained Location Data 504 is then associated with some location context or geographic place, additional obtained Subscriber Data 506 as well as the Location Date and Time 508 in the database. The entries for Subscriber Data 506 may be pre-populated or otherwise derived or obtained from the wireless network or supporting communications data networks.

The Location Date and Time 508 contains entries representing the date and time of a particular obtained wireless device location to assist in determining, for example, a Pattern value. The Application ID contains entries in the database that associate a particular Application (e.g. Application 1, Application 2, etc.) that may be associated with Event Data 116 in FIG. 1 the Location Data 504 associated with the Event Data 116 and the Date and Time 508 associated with the Event Data 116. The Pattern value for the associated Wireless Device ID 502 has been generated due to some previous event or process and may take on a null or default value if a value has not previously been calculated. Both the Pattern value and Historical score values 514 may be used in one or more Location Recognition Logic Resources 112 (FIG. 1) to generate subsequent Pattern values that may be stored in the exemplary Wireless Device ID Database 108.

FIG. 6 depicts exemplary entries in an exemplary Location Pattern Database 110 shown in FIG. 1. In particular a first entry includes an association among a Wireless Device ID 502 (e.g. in this case an MDN), and one or more addresses 602 (e.g. Address 1, Address 2), one or more additional directory numbers 604 (e.g. Phone 1, Phone 2), other or additional Related Locations 606 and Related Wireless Device IDs 608 associated with the first entry Wireless Device ID 502. The Wireless Device ID 502 may be used as a primary parameter used to associate data from the Wireless Device ID Database 108 (FIG. 5). The Wireless Device ID 502 may be used as the primary parameter used to associate data from the Wireless Device ID Database 108 in FIG. 1, the present Location Pattern Database 110 in FIG. 1 and Event Data 116 in FIG. 1 to provide aggregate data and appropriate parameters to be used in one or more Location Recognition Logic Resources 112 in FIG. 1. The entries for Address 1, Address 2, Phone 1, Phone 2 and other or additional Related Locations 606 and Related Wireless Device ID Entries 608 may be provided directly by an individual obtained from a communications network or provided along with Event Data 116. Address 1 may represent some location associated with the Wireless Device ID 502 and may contain detailed address data including House Number, Apartment Number, Street Name, City, State, County, District, Postal Code, Country or other relevant address data. Address 2 may represent some other location associated with the Wireless Device ID 502 and may contain detailed address data including Building Number, Suite Number, Street Name, City, State, Postal Code, Country or other relevant address data. Phone 1 and Phone 2 represent additional, telephone numbers that may be associated with the Wireless Device ID 502. These telephone numbers are geographically based and are of the format CC for Country Code plus NDC for National Destination Code plus SN for Subscriber Number. Note that CC and NDC are geographically based and therefore contain a location data component that may be used to generate a value associated with the Wireless Device ID 502. These telephone numbers may be other Mobile Directory Numbers (MDNs) wireline telephone numbers. Other Related Locations represent other locations associated with the Wireless Device ID 502 and may take on address values similar to Address 1 and Address 2 as well as telephone numbers similar to Phone 1 and Phone 2. These other locations may represent, for example, locations frequented in a particular location area or commonly visited area. Related Wireless Device ID 608 entries may be provided that may be used to associate a record in the present exemplary Location Pattern Database 110 with another record in the present exemplary Location Pattern Database 110 identified by the Wireless Device ID 502 or to associate multiple records identified by the Wireless Device ID 502 in the exemplary Wireless Device ID Database 108 in FIG. 1. This association may be required when, for example, multiple Wireless Device IDs or MDNs 502 are associated among family members that may reside within the same household or otherwise share applications or accounts associated by the same Application ID within an exemplary Wireless Device ID Database 108 FIG. 1. The data stored in the exemplary Location Pattern Database 110 may be used along with the data stored in the exemplary Wireless Device ID Database 108 in FIG. 1 as parameters used by one or more Location Recognition Logic Resources 112 in FIG. 1.

FIG. 7 depicts exemplary entries in an exemplary Logic Resource Configuration Data 114 file shown in FIG. 1. This exemplary Logic Resource Configuration Data 114 file is used to provide information and data to one or more Location Recognition Logic Resource 112 in FIG. 1 that indicates the particular data parameters and factors for the data parameters used by the Location Recognition Logic Resources 112 shown in FIG. 1. In particular, as depicted in FIG. 7, a first entry includes an Application ID 702, Location Pattern Data 704 and the particular Location Recognition Logic Resource 706 associated with the particular Application ID 702 and Location Pattern Data 704. The Application ID 702 represents the same Application ID within the Wireless Device ID Database 108 in FIG. 5 and is comprised of particular Events 708 (e.g. Event 1, Event n, etc.) and Weighting Factors 710 for those Events 708 associated with a particular Application (e.g. Application 1, Application 2, etc.). These Events 708 (e.g. Event 1, Event n, etc.) are events associated with Event Data 116 in FIG. 1 associated with some Location Data Event in FIG. 1, associated with some application requiring a Pattern value for utility, such as for detecting identity theft and fraud. The Weighting Factors 710 are used to provide a relative value of the importance of the particular Event 708 (e.g. Event 1, Event n, etc.) for the particular Application (e.g. Application 1, Application 2, etc.) used by one or more Location Recognition Logic Resources 112 in FIG. 1. The values, of these Weighting Factors 710 may be changed automatically based upon the distance and time variances among any of the location and time parameters used enabling the location Recognition Logic Resources 112 in FIG. 1 to provide accurate Pattern values indicating a likelihood of identity theft for the particular application represented by the Application ID.

The Location Pattern Data 704 is comprised of particular Locations 712 (e.g. MSCID, CID, MCC, MNC, NDC, State, LAC, etc.) and Weighting Factors 714 for those Locations 712 associated with a particular Application (e.g. Application 1, Application 2, etc.) and the provided Location Pattern Data 704 within the exemplary Location Pattern Database 110. The Weighting Factors 714 are used to provide a relative value of the importance of the particular Location 712 for the particular Application (e.g. Application 1, Application 2, etc.) used by one or more Location Recognition Logic Resources 112 in FIG. 1. The values of these Weighting Factors 714 may be changed automatically based upon the distance and time variances among any of the location and time parameters used enabling the Location Recognition Logic Resources 112 in FIG. 1 to provide accurate Pattern values indicating a likelihood of identity theft for the particular application represented by the Application ID.

Figure 8:
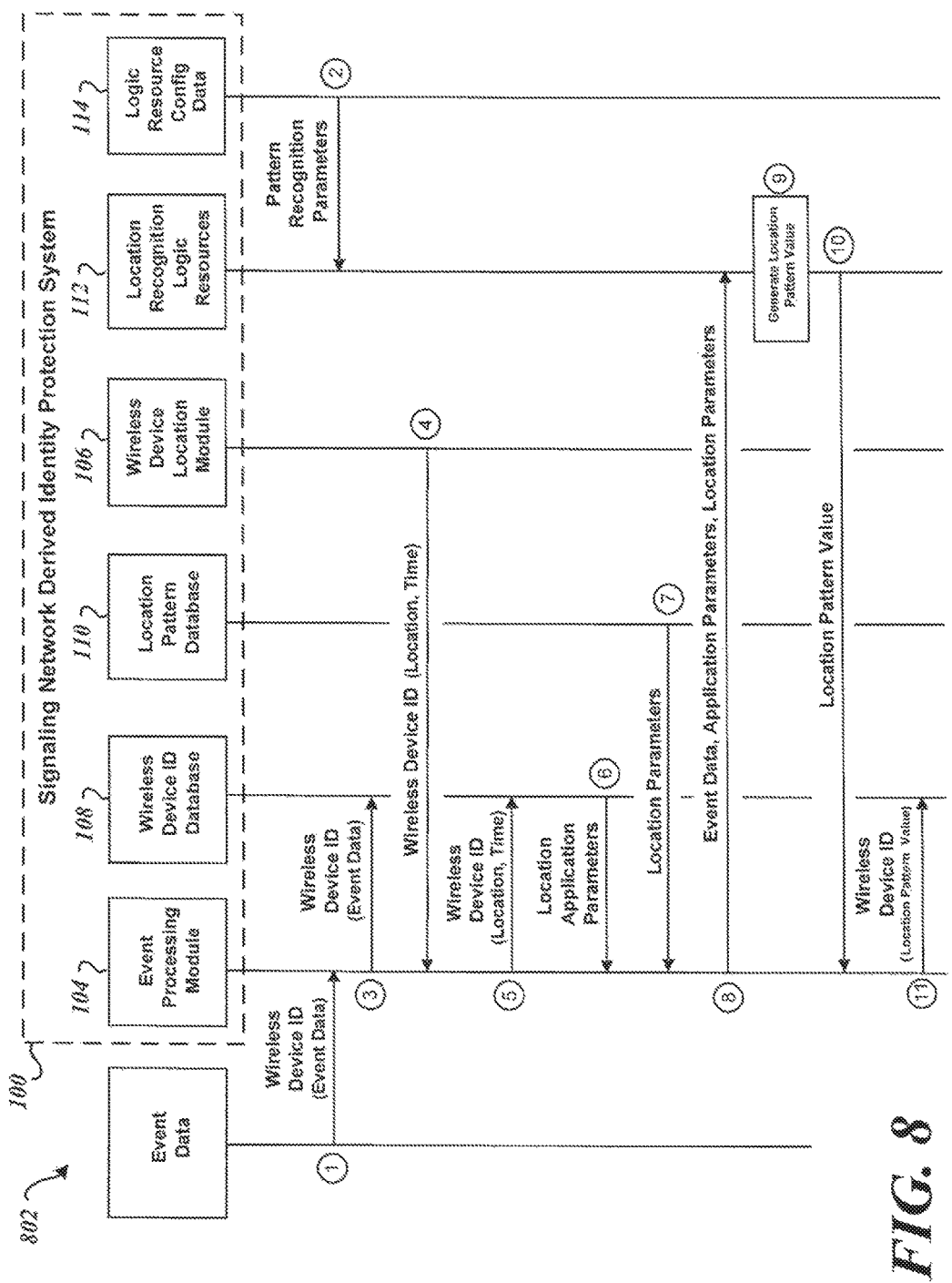
FIG. 8 depicts an exemplary information flow diagram of the Signaling Network Derived Identity Protection System.

FIG. 8 depicts an exemplary detailed information and system flow diagram 802 representing the operation of the Signaling Network Derived Identity Protection System 100, in accordance with one embodiment of the present invention. In this exemplary information and system flow, an entity or individual may initially invoke manually or automatically some transaction or application-based activity associated with some application resulting in Event Data 116 being obtained by the Signaling Network Derived identity Protection System 100.

Step 1: A Location Event occurs and a Wireless Device ID 502 and associated Event Data 116 is sent to the Event Processing Module 104 of the Signaling Network Derived Identity Protection System 100. The Wireless Device ID 502 and associated Event Data 116 may be sent autonomously or requested based on some other interaction between the Signaling Network Derived identity Protection System 100 and an application.

Step 2: Logic Resource Configuration Parameters are either requested from the Logic Resource Configuration Data 114 or sent to the appropriate Location Recognition Logic Resource 112. This step may occur at any time and is not necessarily dependent on any actions occurring external to the Signaling Network Derived Identity Protection System 100.

Step 3: The Event Processing Module 104 passes the Wireless Device ID 502 and associated Event Data 116 to the Wireless Device ID Database 108 for storage and subsequent use by the appropriate Location Recognition Logic Resource 112 associated with a particular application requiring a Pattern value.

Step 4: The Wireless Device Location Module 106 passes the Wireless Device ID 502 along with the associated Location Data, Subscriber Data and Time either directly to the Wireless Device ID Database 108 or indirectly via the Event Processing Module 104. The Location Data may have been initially requested by the Wireless Device Location Module 106 via the Event Processing Module 104 or autonomously sent to the Wireless Device Location Module 106.

Step 5: If the Location Data, Subscriber Data and Time associated with the Wireless Device ID 502 is passed to the Event Processing Module 104, it is then passed to the Wireless Device ID Database 108.

Step 6: The appropriate data and parameters stored within the Wireless Device ID Database 108 and required by the Location Recognition Logic Resources 112 are passed either directly to the Location Recognition Logic Resources 112 or indirectly to the Location Recognition Logic Resources 112 via the Event Processing Module 104.

Step 7: The appropriate data and parameters stored within the Location Pattern Database 110 and required by the Location Recognition Logic Resources 112 are passed either directly to the Location Recognition Logic Resources 112 or indirectly to the Location Recognition Logic Resources 112 via the Event Processing Module 104.

Step 8: If the appropriate data and parameters have been passed to the Event Processing Module 104 from the Wireless Device ID Database 108 or the Location Pattern Database 110, they are subsequently passed to the appropriate Location Recognition Logic Resource to be used in a calculation to generate a Pattern value for the particular Event and application requiring a Pattern value.

Step 9: A Pattern value is generated and passed either directly to the Wireless Device ID Database 108 or indirectly to the Wireless Device ID Database 108 via the Event Processing Module 104.

Step 10: If the Pattern value is passed to the Event Processing Module 104, it is then passed to the Wireless Device ID Database 108 (Step 11) for storage and to be used by one or more applications requiring that Pattern value.

Acronyms used in this application are described below.

ANSI American National Standards Institute
ANSI-41 American National Standards Institute—Standard 41
ATI Any-Time-Interrogation
BS Base Station
BSC Base Station Controller
CAMEL Customized Applications Mobile network Enhanced Logic
CAP CAMEL Application Part
CC Country Code
CDMA Code Division Multiple Access
CGI Cell Global Identification
CI/CID Cell Identity
ESN Electronic Serial Number
ETSI European Telecommunications Standards institute
G-MSC Gateway Mobile Switching Center
GMLC Gateway Mobile Location Center
GSM Global System for Mobile communications
GT Global Title
GTT Global Title Translation
HLR Home Location Register
IMEI International Mobile Equipment Identity
IMSI International Mobile Subscriber Identity IN intelligent Network
IP Internet Protocol
ITU International Telecommunications Union
LAC Location Area Code
LAI Location Area Identification
MAP Mobile Application Part
MCC Mobile Country Code
MDN Mobile Directory Number
MIN Mobile identification Number (ANSI-41/CDMA)
MNC Mobile Network Code
MSC Mobile Switching Center
MSCID Mobile Switching Center Identity
MSISDN Mobile Station ISDN number (GSM)
NANP North American Numbering Plan
NANPA North American Numbering Plan Administration
NDC National Destination Code
NPA Numbering Plan Area
PLMN Public Land Mobile Network
SCF Service Control Function
SCP Service Control Point
SigTran Signaling Translation
SMS Short Message Service
SMSC Short Message Service Center
SP Signaling Point
SRF Specialized Resource Function
SS7 Signaling System 7
SSF Service Switching Function
SSP Service Switching Point
STP Signaling Transfer Point
UMA Unlicensed Mobile Access
UNC UMA Network Controller
VLR Visitor Location Register In the various embodiments, a pattern value is developed. The pattern value is a non-dimensional numerical value corresponding to a probability that an electronic activity of interest is fraudulent. The pattern value falls within a predefined numerical range. For example, the pattern value range may be from one to ninety nine (1-99) where a low pattern value may indicate that the electronic activity of interest is likely not fraudulent, and a high pattern value may indicate that the electronic activity of interest is likely to be fraudulent (or vice versa). Any suitable pattern value range may be used to define the relative probability of a determined pattern value.

The pattern value is determined based upon a statistical correlation between one or more wireless device location indicia as related to the location of the electronic activity of interest. Additionally, or alternatively, the pattern value may be determined based upon a statistical correlation between one or more wireless device supplemental information indicia as it is related to the location of the electronic activity of interest. Exemplary wireless device location indicia and wireless device supplemental information indicia are described herein. Thus, the determined pattern value is more than a mere location comparison between the location of the wireless device 118 and the location of the electronic activity of interest. Accordingly, the pattern value provides the unexpected result of indicating a statistical relevant probability that the electronic activity of interest is likely, or is not likely, to be fraudulent.

Statistical correlation methods and processes of generating identity scores are well known in the arts. Identity scoring was originally developed for use by financial services firms to measure the fraud risk for new customers opening accounts. Typical external credit and fraud checks often fail to detect erroneous background information. The use of identity scoring is used for verifying the legitimacy of an individual's identity.

Further, statistical correlation processes and methods of authenticating the identity of a wireless device 118 based upon wireless device authentication information are well known in the arts. Mobile device authentication was originally developed for use by cellular providers to protect against fraudulent use of their networks by illegitimate mobile devices. Various authentication standards and protocols are defined in the American National Standards Institute 41 (ANSI-41) standards and elsewhere.

Embodiments of the Signaling Network Derived Identity Protection System 100 generate the pattern value using statistical correlation processes and methods that are similar to those used to determine the identity score and/or the authenticity of a wireless device. However, unlike the identity information and/or the wireless device authentication information, embodiments of the Signaling Network Derived Identity Protection System 100 generate the pattern value using signaling system information pertaining to the wireless device 118. The signaling system information, and information relative to the electronic activity of interest, are statistically analyzed such that the pattern value is generated, thereby indicating a value that is indicative of the probability that the electronic activity of interest is fraudulent or valid. Any suitable statistical correlation process and/or method may be used to determine the pattern value, and is not described herein in greater detail for brevity.

Figure 9:
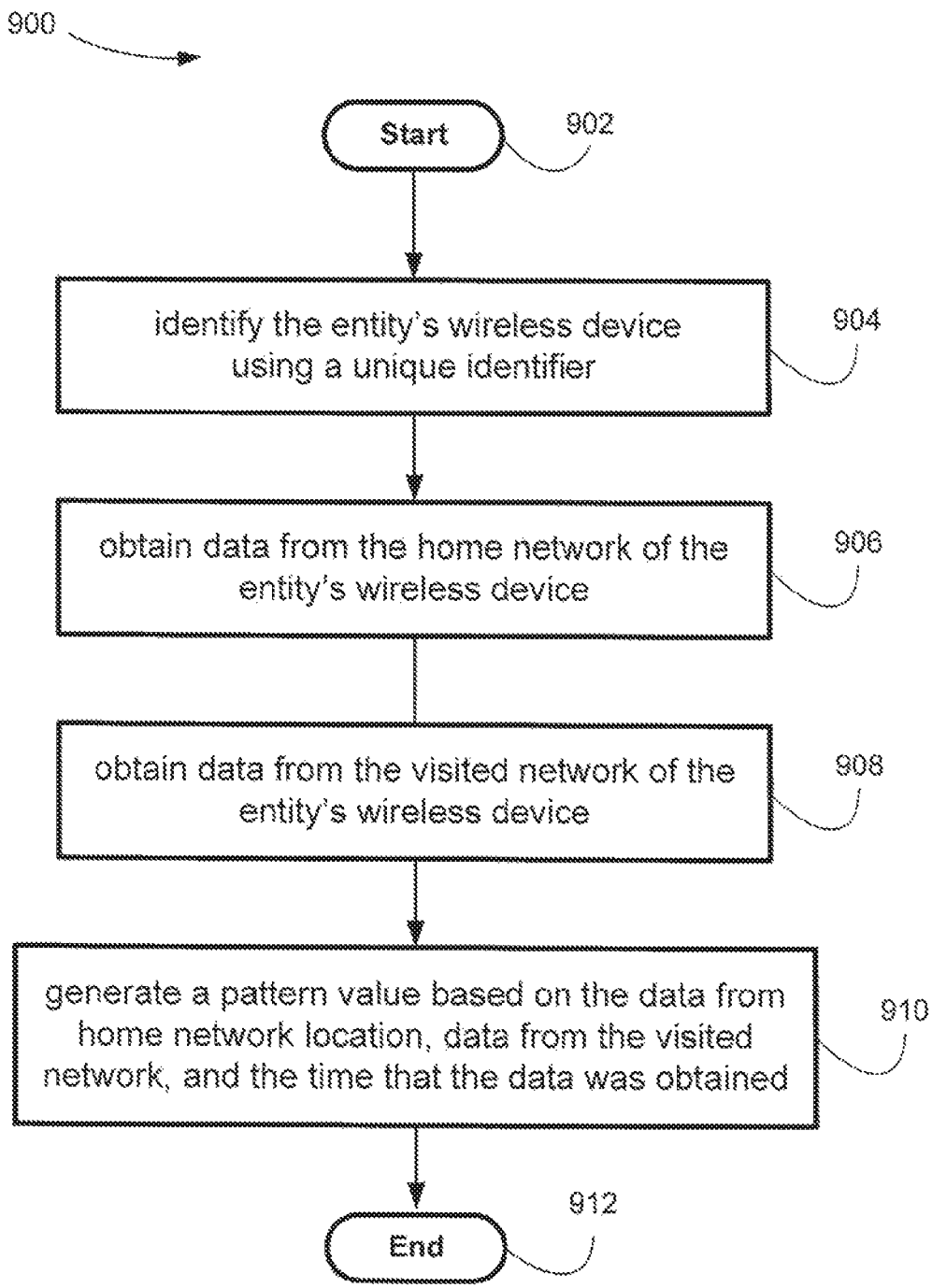
FIGS. 9-10 depict exemplary flow charts disclosing operation of embodiments of the Signaling Network Derived Identity Protection System.
Figure 10:
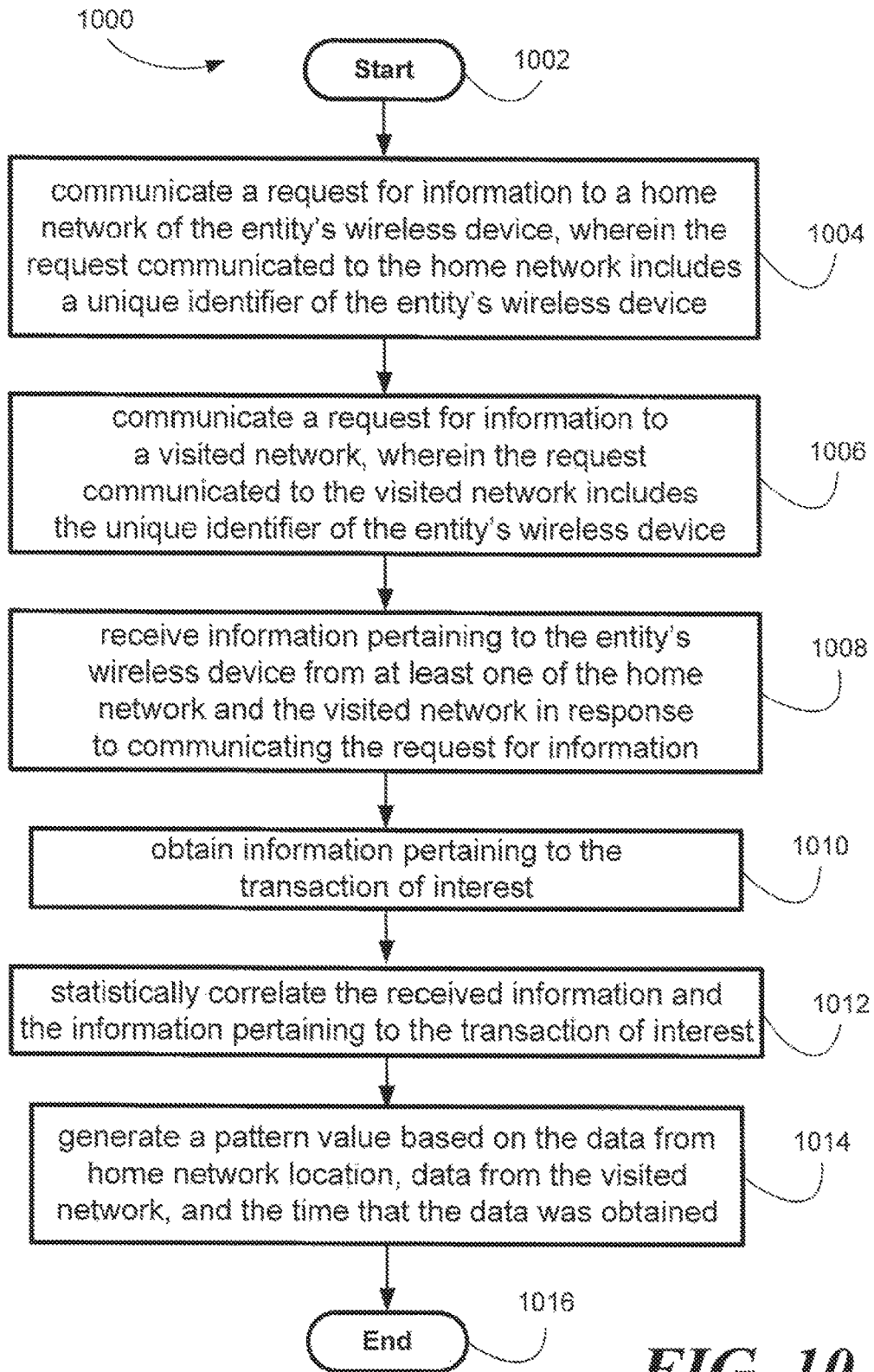

FIGS. 9 and 10 depict flow charts 900 and 1000, respectively, disclosing algorithms describing operation of an exemplary embodiment of the Signaling Network Derived Identity Protection System 100. The flow charts 900 and 1000 show the architecture, functionality, and operation of a possible implementation of the software for implementing the Signaling Network Derived Identity Protection System 100. In this regard, each block may represent a module, segment, or portion of code, which comprises one or more executable instructions for implementing the specified logical function(s). It should also be noted that in some alternative implementations, the functions noted in the blocks may occur out of the order noted in FIG. 9, may include additional functions, and/or may omit some functions. For example, two blocks shown in succession in FIG. 9 or in FIG. 10 may in fact be executed substantially concurrently, the blocks may sometimes be executed in the reverse order, or some of the blocks, may not be executed in all instances, depending upon the functionality involved. All such modifications and variations are intended to be included herein within the scope of this disclosure.

The process of FIG. 9 starts at block 902. At block 904, a unique identifier is used to identify the entity's wireless device 118. In the various embodiments, the unique identifier representing art entity's wireless device 118 may be a MDN, MSISDN, or other identifier that uniquely identifies the wireless device 118. Accordingly, the identity of the wireless device 118 of interest is therefore associated with a person of interest.

At block 906, signaling system network level data is obtained from the home network of the entity's wireless device 118 via the communications signaling network 102. The data represents information pertaining to the entity's wireless device 118 and is determinable based upon the unique identifier of the entity's wireless device 118. Preferably, the received signaling system network level data is not available from other sources. The request for information is made to the home network using appropriate signaling system protocol, communicated via the communications signaling network 102. The request is based upon the unique identifier of the entity's wireless device 118. For example, various wireless device location and/or wireless device supplemental information data is stored at the of the wireless device 118. In response to the request for information, information pertaining to the wireless device 118 is provided to the Signaling Network Derived Identity Protection System 100.

At block. 908, the signaling system network level data is obtained from the visited network of the entity's wireless device 118. The data represents information pertaining to the entity's wireless device 118 and is determinable based upon the unique identifier of the entity's wireless device 118. Thus, a request for information is made to the visited network using appropriate signaling system protocol. For example, but not limited to, the obtained data may be associated with the that is monitoring a current location of the wireless device 118. It is appreciated that in some situations, the HLR and VLR may be at the same location, or even be the same entity.

At block 910, a pattern value is generated based on the signaling system network level data from the home network, the signaling system network level data from the visited network, and/or a time that the signaling system network level data was obtained. The process of FIG. 9 ends at block 912.

The process of FIG. 10 starts at block 1002. At block 1004, a request for information is communicated to the home network of the entity's wireless device, wherein the request communicated to the home network includes a unique identifier of the entity's wireless device 118. At block 1006, a request for information is communicated to the visited network, wherein the request communicated to the visited network also includes the unique identifier of the entity's wireless device. At block 1008, signaling system network level information pertaining to the entity's wireless device is received from at least one of the home network and the visited network in response to communicating the request for information. At block 1010, information pertaining to the electronic activity of interest is obtained. At block 1012, the received information and the information pertaining to the electronic activity of interest are statistically correlated. At block 1014, a pattern value is generated based on the statistical correlation, wherein the pattern value indicates a likelihood that the electronic activity of interest is valid. The process ends at block 1016.

The generated pattern value is indicative of whether or not a particular electronic activity of interest that is associated with the wireless device 118 is likely to be fraudulent or valid. Since the identity of the entity attempting to complete the electronic activity of interest can be associated with the wireless device 118, then the pattern value is indicative of the likelihood of fraud by the individual attempting to complete the electronic activity of interest.

For example, an individual associated with the wireless device 118 may be attempting to conduct a financial transaction, such as a purchase using a credit card. The generated pattern value would give an indication whether or not the electronic activity of interest, the financial transaction, is likely to be valid when the retrieved wireless device location indicia and/or the wireless device supplemental information indicia tend to indicate that the individual attempting to conduct the electronic activity of interest is the same individual that is associated with the wireless device 118.

In an exemplary embodiment, the age of the home network location and/or of the visited network location for the wireless device 118 is employed to generate the pattern value. For example, but not limited to, the age of the home network location and/or the age of the visited network location (wireless device supplemental information indicia) are time periods (durations) corresponding to the time between the request for information from the home network location and/or the visited network location (made using appropriate signaling system protocol), and the time that the wireless device 118 was last detected by the communications signaling network 102.

An active wireless device 118 periodically provides signaling information to the communications signaling network 102 (using appropriate signaling system protocol). The communicated signaling information is detected by one or more cell sites. Once a cell site is identified that is in communication range of the wireless device 118, incoming communications can be properly routed to the wireless device 118 via the identified cell site. Thus, the home network location and/or the visited network location are monitoring the signaling communications from the wireless device 118, and thus know the particular cell site that is in communication with the wireless device 118.

The time that the signaling information from the wireless device 118 is received by the communications signaling network 102 is stored by the HLR and/or the VLR. Thus, age information pertaining to the wireless device 118 is determinable based upon the time of the last detection of the wireless device 118 and the time of an information request generated by the Signaling Network Derived Identity Protection System 100. The time of the last detection of the wireless device 118 is provided by the home network location and/or the visited network location in response to the information request.

Also during the process whereby the wireless device 118 communicates to the communications signaling system network 102, the identity of receiving cell site(s) is determined and stored by the HLR and/or the VLR. Thus, incoming communications can be routed to the identified cell site that is within reception range of wireless device 118. The identified cell site is identifiable by its geographic location. For example, but not limited to, latitude and longitude information are used to identify the location of the identified cell site. Thus, the HLR and/or the VLR can provide cell site identity information (wireless device supplemental information indicia) such that the cell site location may be derived therefrom by the Signaling Network Derived Identity Protection System 100. Alternatively, or additionally, the and/or the VLR may provide cell site geographic location information directly (wireless device location indicia) to the requesting Signaling Network Derived Identity Protection System 100.

As an illustrative example, a wireless device 118 may have been detected in City A (the location) at a time that is six hours (the age) since the last signaling system communication was received from the wireless device 118. Here, the time of the electronic activity of interest corresponds to the time that the Signaling Network Derived Identity Protection. System 100 requests information from the home network location and/or the visited network location. Further, in this example, it is assumed that the location of the electronic activity is in City B, which is a substantial distance from City A. It is appreciated that a person, flying from City A to City B is required to turn off their wireless device 118 during the flight. Further assume that the individual associated with the wireless device 118, at the time that the Signaling Network Derived Identity Protection System 100 is requesting signaling system network level information from the home network location and/or the visited network location, is attempting to conduct the electronic activity of interest. For example, the individual may be buying a drink from a vendor at the airport of City B.

The Signaling Network Derived Identity Protection System 100 accesses the home network location and/or the visited network location (the HLR and/or the VLR) to obtain the location information and the age information for the wireless device 118. Further, assume that in a first scenario, that the distance is 600 miles between City A (as determined from the location of the last signaling system communication received from the wireless device 118) and City B (as determined from the location of the electronic activity of interest). Thus, in this first scenario, the Signaling Network Derived Identity Protection System 100 uses a statistical correlation method and process to conclude that there is a reasonable probability that the individual is now in City B in view that it is statistically reasonable that six hours are required to travel by air from City A to City B. Since it is statistically reasonable that it could take six hours to fly from City A to City B, the pattern value would indicate a reasonable likelihood that the electronic activity of interest is valid.

In contrast, in a second scenario, assume that the distance between City A and City B is 6,600 miles, as determined by the above-described location information. Here, it may be reasonably inferred that a twelve hour flight time could be expected for flying the 6,600 mile distance between City A and City B. Thus, in this second scenario, the Signaling Network Derived Identity Protection System 100 uses the statistical correlation method and process to conclude that there is a low probability that the individual is now in City B (in view that it is not reasonable that the wireless device 118 can travel from City A to City B in six hours). Since it is not statistically reasonable that it could take only six hours to travel from City A to City B, the pattern value would indicate a reasonable likelihood that the electronic activity of interest is fraudulent.

In an exemplary embodiment, one or more of the country code identifier, the national destination code identifier, the mobile country code identifier, and the mobile network code identifier of the directory number for the wireless device 118 is employed to generate the pattern value. The above-described identifiers, available from the home network location and/or the visited network location, provide supplemental information that is related to location information associated with the wireless device 118. For example, one of the above-described identifiers may include a regional telephone number area code that identifies a particular geographic region. This supplemental information is then used by the Signaling Network Derived Identity Protection System 100 to determine the pattern value. Such supplemental information is statistically correlated with the location information associated with the electronic activity of interest.

For example, a wireless device 118 may have been detected in City A in Country 1 at the time of the electronic activity of interest. The Signaling Network Derived Identity Protection System 100 accesses the home network location and/or the visited network location to obtain one or more of the country code identifier, the national destination code identifier, the mobile country code identifier, and the mobile network code identifier for the wireless device 118. Assume that the country code identifier, the national destination code identifier, the mobile country code identifier, and/or the mobile network code identifier information obtained from the home network location and/or the visited network location corresponds to the location of the electronic activity of interest (City A, Country 1). The Signaling Network Derived Identity Protection System 100, using its statistical correlation method and process, would then statistically conclude that there is a reasonable probability that the electronic activity of interest is likely to be valid (since the information from the identifiers corresponds to the location of the electronic activity of interest). On the other hand, assume that the country code identifier, the national destination code identifier, the mobile country code identifier, and/or the mobile network code identifier do not correspond to the location of the electronic activity of interest (City A, Country 1). For example, the country code identifier and/or the national destination code identifier might correspond to a different country. The Signaling Network Derived Identity Protection System 100 may statistically conclude that there is a reasonable probability that the electronic activity of interest is likely to be fraudulent.

The IMEI of a GSM wireless device, and the ESN of a CDMA wireless device, are unique identifiers embedded in software of the wireless device 118. For example, the IMEI or ESN may be defined as serial numbers of the wireless device 118. In some embodiments, the IMEI or ESN is used to determine the pattern value since this information may be available as signaling system network level data. For example, the IMEI or ESN is embedded in software of a SIM card of the wireless device 118 and may be associated with the MDN or other identifier. If there is a change between the IMEI or ESN and the associated MDN, the Signaling Network Derived Identity Protection System 100 would determine a pattern value that indicates that there is a reasonable probability that the electronic activity of interest is likely to be fraudulent.

In some embodiments, the state of the wireless device 118 may be used to determine, the pattern value. It is appreciated that in some situations, a fraudulent electronic activity may occur in the absence of the wireless device 118 (which is tantamount to the wireless device 118 being inactive, or "off"). If the state of the wireless device 118 is active (the wireless device 118 is "on"), the Signaling Network Derived Identity protection System 100 may then statistically conclude that there is a reasonable probability that the electronic activity of interest is likely to be valid (since the wireless device 118 is in an active state). On the other hand, the Signaling Network Derived identity Protection System 100 may statistically conclude that there is a reasonable probability that the electronic activity of interest is likely to be fraudulent (if the state of the wireless device 118 is inactive). The state of the wireless device 118 may be provided by the home network location and/or the visited network location in response to a request for information generated by the Signaling Network Derived Identity Protection System 100.

Many different types of wireless devices 118 are available to consumers. Further, many different wireless device connectivity subscription services are available to consumers. Information pertaining to the type of wireless device 118, the manufacturer of the wireless device 118, the manufacturer model of the wireless device 118, and/or the type of subscription service used by the wireless device 118 may be used to infer whether or not a electronic activity of interest is likely to be valid or fraudulent. For example, very inexpensive cell phones using a prepaid subscription are known to be associated with criminal activity. Thus, an electronic activity of interest associated with an inexpensive cell phone, and/or a prepaid subscription service, may have higher likelihood of being a fraudulent transaction is compared to a relatively expensive wireless device 118 using a premium subscription service.

Information received from the home network location and/or the visited network location pertaining to the wireless device 118 may be used to determine the manufacturer, the type, and/or the model of the wireless device 118, and thus, enable a determination of the relative value (e.g., purchase price) of the wireless device 118. Additionally, or alternatively, supplemental information received from the home network location and/or the visited network location pertaining to the wireless device 118 may be used to determine the nature of the subscription service used by the wireless device 118. Accordingly, the Signaling Network Derived Identity Protection System 100 may statistically conclude that there is a reasonable probability that the electronic activity of interest is likely to be valid when the wireless device 118 is a relatively expensive device, and/or is using a premium subscription service. On the other hand, the Signaling Network Derived Identity Protection System 100 may statistically conclude that there is a reasonable probability that the electronic activity of interest is likely to be fraudulent if the wireless device 118 is a relatively inexpensive device. Alternatively, or additionally, the Signaling Network Derived Identity Protection System 100 may statistically conclude that there is a reasonable probability that the electronic activity of interest is likely to be fraudulent if the wireless device 118 is using a prepaid subscription service (as contrasted with a post-paid subscription service).

The length of time that a consumer has had a particular subscription service may also be relevant to the determination of a pattern value. It is appreciated that a criminal engaging in fraudulent electronic activities may frequently change between subscription service providers, or frequently change their wireless device 118 (and thus, for all practical purposes, obtain a new subscription service) so as to avoid detection by law enforcement agencies. On the other hand, it is appreciated that an honest citizen will likely keep their subscription service provider for a relatively long period of time. Such honest citizens typically have a legitimate reason to change their subscription service provider, such as when they relocate to a different region of the country. Thus, an electronic activity of interest associated with a wireless device 118 that has only been receiving service from a particular subscription service provider for relatively short period of time may have higher likelihood of being a fraudulent transaction as compared to a wireless device 118 that has been receiving service from a particular subscription service provider for a relatively long period of time.

Supplemental information received from the some network location and/or the visited network location may include information pertaining to the type of subscript service that the wireless device 118 is receiving from a particular subscription service provider. For example, available billing and service registration information provided by the home network location may indicate the type of subscription used by the wireless device 118. It is appreciated that a criminal engaging in fraudulent electronic activities is more likely to subscribe to a relatively inexpensive subscription service and that an honest citizen is more likely to subscribe to a premium subscription service. Accordingly, the Signaling Network Derived Identity Protection System 100 may statistically conclude that there is a reasonable probability that the electronic activity of interest is likely to be valid when the wireless device 118 is receiving a premium subscription service. On the other hand, the Signaling Network Derived Identity Protection System 100 may statistically conclude that there is a reasonable probability that the electronic activity of interest likely to be fraudulent if the wireless device 118 has been receiving an inexpensive subscription service.

The length of time that has passed since the entity's current mobile directory number was associated with the entity's current wireless network subscription and/or was associated with the entity may be relevant to the determination of a pattern value. Here, a relatively long duration may indicate that the electronic activity of interest is likely to be valid since an honest citizen is more likely to retain their current mobile directory number for a long time. In contrast, a relatively short duration may indicate that the electronic activity of interest is likely to be fraudulent since criminals engaging in fraudulent electronic activities are known to frequently change their current mobile directory number in an effort to avoid detection by law enforcement agencies. Accordingly, embodiments of the Signaling Network Derived Identity Protection System 100 use the length of time that has passed since the entity's current mobile directory number was associated with the entity's current wireless network subscription and/or the entity in determining the pattern value.

In some embodiments, an identity of the particular wireless network operator providing service to the wireless device 118 is employed to generate the pattern value. It is appreciated that service provided from a well known subscription service provider may tend to indicate that the electronic activity of interest is valid. On the other hand, if the subscription service provider is a small organization, and or if the subscription service provider is based in a country with little to no regulatory oversight or legal enforcement, it is appreciated that such a subscription service provider may tend to indicate that the electronic activity of interest is likely to be fraudulent. Accordingly, embodiments of the Signaling Network Derived Identity Protection System 100 use the identity of the particular wireless network operator in determining the pattern value.

In some embodiments, modifications to the entity's registration information, such as a service address, is employed to generate the pattern value. Here, registration information may be provided by the borne network location and/or the visited network location. It is appreciated that a registration information that has been the same for a relatively long time may tend to indicate that the electronic activity of interest is valid as an honest citizen would not be expected to frequently change their registration information, at least in the absence of a legitimate reason. On the other hand, if the registration information has been recently and/or frequently changed, it is appreciated that such changes in the registration information may tend to indicate that the electronic activity of interest is likely to be fraudulent since criminals engaging in fraudulent electronic activities are known to frequently change such information in an effort to avoid detection by law enforcement agencies. Accordingly, embodiments of the Signaling Network Derived Identity Protection System 100 consider modifications made to the entity's registration information in determining the pattern value. Non-limiting examples of registration information pertaining to characteristics of the entity include the entity's name, age, date of birth, social security number, driver's license number, family contact in passwords, service address, etc.

Recent regulatory provisions allow an individual to retain their current mobile directory number if the entity changes their subscription service provider. In some embodiments, the service history of the entity's current mobile directory number is received from the home network location. It is appreciated that a criminal engaging in fraudulent electronic activities may frequently change their subscription service provider in an effort to avoid detection by legal enforcement agencies. In contrast, an honest citizen is more likely to retain their service provider for a long period of time. Accordingly, it is appreciated that a service history demonstrating frequent and reoccurring changes to different subscription service providers may be associated with criminal activity and that the electronic activity of interest is likely to be fraudulent. On the other hand, it is appreciated that a history demonstrating a long duration of service from a single subscription service provider may tend to indicate that the electronic activity of interest is valid. Accordingly, embodiments of the Signaling Network Derived identity Protection System 100 consider the service history of the wireless device 118 determining the pattern value.

The above-described wireless device location indicia and wireless device supplemental information indicia provided by the home network location and/or the visited network location in response to a request for information from embodiments of the Signaling Network Derived Identity Protection System 100 are used to determine the pattern value using a suitable statistical correlation process and/or method. Embodiments may determine the pattern value using one or more of the above-described indicia. Weighting may be used to adjust the relevance of a particular indicia when the pattern value is determined. Embodiments may selectively pick available indicia for consideration when the pattern value is determined.

Further, other available supplemental information may also be considered when the pattern value is determined. For example, a remote source may provide a credit history or the like that is considered when the pattern value is determined.

Figure 11:
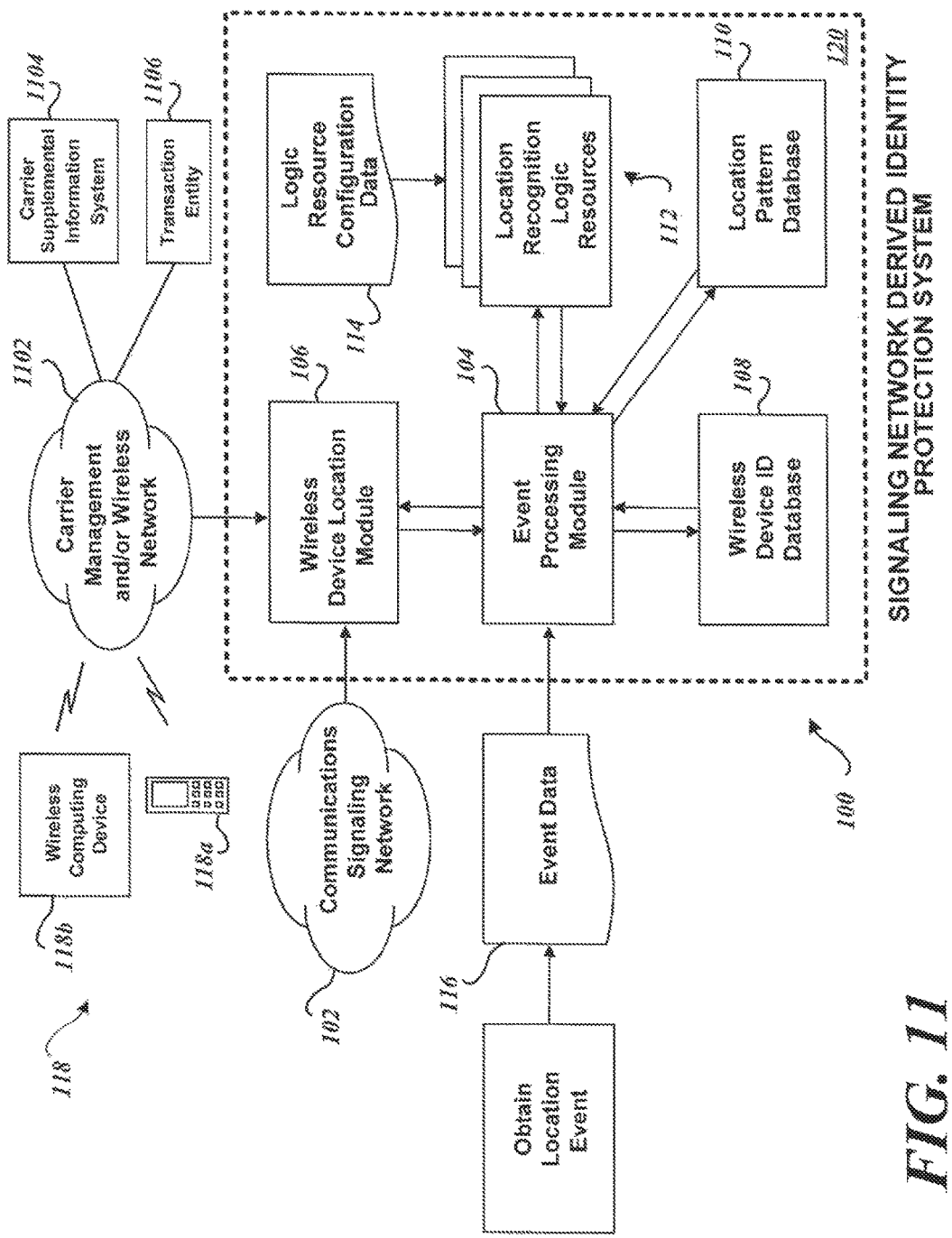
FIG. 11 depicts functional entities and modules of an alternative Signaling Network Derived Identity Protection System that is configured to receive supplemental information from a remote source.

FIG. 11 depicts functional entities and modules of an alternative Signaling Network Derived Identity Protection System 100 that is configured to receive supplemental in via a carrier management and/or wireless network 1102, from a remote source, denoted herein as a carrier supplemental information system 1104. The carrier supplemental information system 1104 provides supplemental account level information, administrative level information, and/or network level information that is pertinent to the wireless device 118.

Account level information may in various types of billing information and/or billing history information. For example, account level information may include, but is not limited to, customer contact information and general information, type of service (e.g., cost, amounts paid, device used, pre-paid amounts or post-paid amounts), and/or account service history (e.g., length of service, payment history, payment trends, and/or applications purchased). Network level information may include, but is not limited to, number porting history, home location information, current location information, and/or time at current location information (e.g., time stamp).

After the pattern value is determined, the pattern value may be communicated to a transaction entity 1106 that is associated with the electronic activity of interest. The transaction entity 1106 may evaluate the pattern value, and based on the pattern value and other relevant information, may make a determination to accept or reject the electronic activity of interest. The pattern value may be communicated to the transaction entity 1106 in any suitable manner. Alternatively, or additionally, embodiments of the Signaling Network Derived Identity Protection System 100 may make a recommendation to to accept or reject the electronic activity of interest, which may then be communicated to the entity that is associated with the electronic activity of interest.

To illustrate use of the supplemental information, amounts owed by and/or payment trends of a mobile phone account associated with wireless device 118 can be verified and integrated into the determination of the pattern value. A length of credit will be based on the length of time the MDN has been on file with the mobile phone account. New credit accounts for family plans and business accounts, the type, number and relative growth of accounts can be used in the determination of the pattern value. Types of credit in use, such as the type of phone, status of account, applications used or purchased may be used in the determination of the pattern value. When various types of supplemental information is combined with signaling system network level information, the determined pattern value presents the credit requesting organization with valuable information regarding the individual associated with a wireless device 118.

An unexpected advantage is that the determined pattern value may provide credit worthiness information that is not available anywhere else in developing nations. In developing nations, hundreds of millions of people are entering the global economy for the first time. Enterprises around the world are trying to find ways to sell products and/or services to an entirely new demographic of consumers. Unfortunately, relatively little is known about these consumers. Determining credit worthiness and authenticating identity of such consumers can be difficult. The wireless device 118 is in many cases, the first introduction and main interactive tool consumers in developing nations have of interacting with the global economy. The determined the pattern value represents a compelling opportunity for providing a valuable service to global and local enterprises alike wishing to provide goods and/or services to developing nation consumers.

Figure 12:
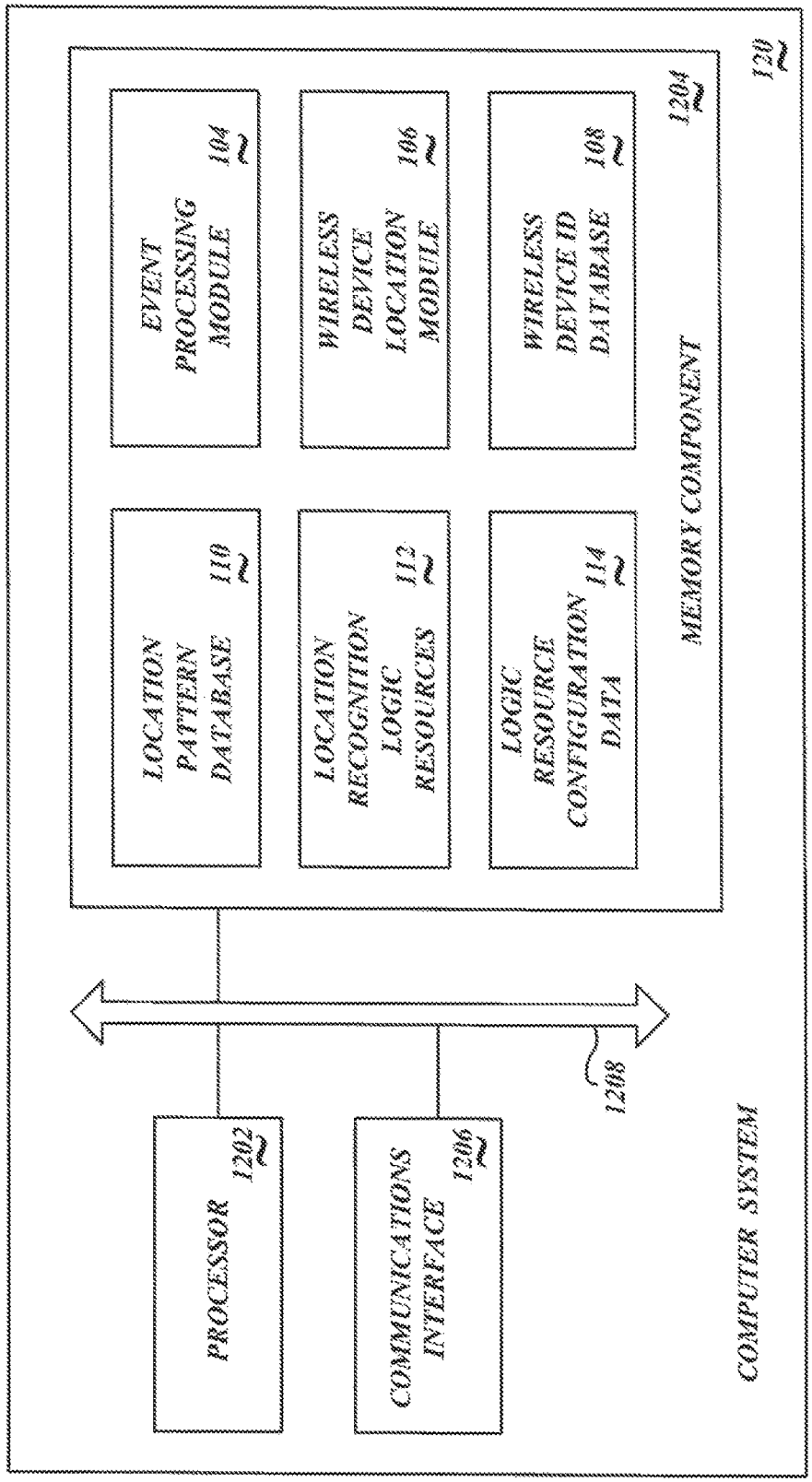
FIG. 12 depicts functional entities and modules of an alternative Signaling Network Derived Identity Protection System that is configured to receive supplemental information from a remote source.

FIG. 12 depicts an exemplary computer system 120 of an embodiment of the Signaling Network Derived identity Protection System 100. The computer system 120 includes at least one processor 1202, at least one memory component 1204 in signal communication with the processor 1202, and at least one communications interface 1206 in signal communication with the processor 1202. The processor 1202, the memory component 1204, and the communications interface 1206 are communicatively coupled to a communication bus 1208, thereby providing connectivity between the above-described components. In alternative embodiments of the Signaling Network Derived Identity Protection System 100, the above-described components may be communicatively coupled to each other in a different manner. For example, one or more of the above-described components may be directly coupled to the processor 1202, or may be coupled to the processor 1202 via intermediary components (not shown). Further, additional components (not shown) may be included in alternative embodiments of the Signaling Network Derived Identity Protection System 100.

The memory component 1204 may be any suitable memory device or system. Depending upon the embodiment, the memory component 1204 may be a dedicated memory system, may be part of another component or system, and/or may be a distributed memory system. The memory component 1204 may also include other logic, modules and/or databases not illustrated or described herein.

In the context of this disclosure, the memory component 1204 is a computer-readable medium that is an electronic, magnetic, optical, or other another physical device or means that contains or stores a computer and/or processor program.

The computer-readable medium can be, for example, but is not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette (magnetic, compact flash card, secure digital, or the like), a random access memory (RAM), a read only memory (ROM), an erasable programmable read-only memory (EPROM, EEPROM, or Flash memory), an optical fiber, and a portable compact disc read-only memory (CDROM). Note that the computer-readable medium, could even be paper or another suitable medium upon which the program associated with logic 908 is printed, as the program can be electronically captured, via for instance optical scanning of the paper or other medium, then compiled, interpreted, or otherwise processed in a suitable manner, if necessary, and then stored in memory component 1204.

The communications interface 1206 is illustrated and described heroin as a single component that is configured to communicate with the home network and the visited network via the communications signaling network 102. Also, the communications interface 1206 is illustrated and described as being configured to communicate with the carrier supplemental information device 1104 via the carrier management and/or wireless network 1102. Further, the communications interface 1206 is illustrated and described as being configured to communicate with the transaction entity 1106 that provides a request for information pertaining to the likelihood that the electronic activity of interest is valid. It is appreciated that the communications interface 1206 is comprised of a plurality of communication devices that act in cooperation so that embodiments of the Signaling Network Derived Identity Protection System 100 are able to access the various entities described herein. Further, the communications signaling network 102 and the carrier management and/or wireless network 1102 may be different types of systems. Accordingly, the various communication devices of the communications interface 1206 will be different from each other so as to support communications over a variety of different networks that may be using different communication formats.

Embodiments of the Signaling Network Derived Identity Protection System 100 are configured to concurrently process a plurality of requests to verify that a plurality of different electronic activities of interest are valid. The plurality of requests may originate from the same transaction entity 1106. That is, it is likely that a large transaction entity 1106, such as a bank or credit card company, will be concurrently conducting many different electronic activities of interest with different customers. Further, embodiments of the Signaling Network Derived Identity Protection System 100 may be configured to concurrently process the plurality of requests for information from many different transaction entities. That is, embodiments are configured to concurrently respond to different transaction entities 1106, such as banks, credit card companies, Internet service providers, and sellers of goods and/or services.

While the preferred embodiment or the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method comprising:
    obtaining first data from a home location register associated with a home network pertaining to the entity's wireless device based upon a unique identifier of the entity's wireless device, the first data comprising location data associated with the electronic device and subscription data associated with the first entity and a mobile network provider of the home network;
    obtaining second data from a visitor location register associated with a visited network pertaining to the entity's wireless device based upon the unique identifier of the entity's wireless device;
    calculating, based at least in part on the subscription data, an age of a mobile subscription associated with the first entity and the mobile network provider;
    generating a pattern value based on the location data of the first data, based on the age associated with the mobile subscription, based on the second data, based on a time that at least one of the location data or the second data was obtained, and based on an age of the second data obtained from the visitor location register; and
    providing the pattern value to a transaction entity, wherein the receipt of the pattern value by the transaction entity causes the transaction entity to perform one or more subsequent actions with respect to an electronic activity of interest, the electronic activity of interest being associated with the entity's wireless device.

2. The method according to claim 1, wherein the generated pattern value quantifies a likelihood that the entity will conduct a fraudulent transaction, and wherein the pattern value is provided to the transaction entity prior to receiving the electronic activity of interest associated with the entity's wireless device.

3. The method according to claim 1, wherein the pattern value is provided to the transaction entity within a period of time during which the electronic activity of interest associated with the entity's wireless device is processed.

4. The method according to claim 1, wherein the pattern value is provided to the transaction entity prior to commencement of a delivery process for providing a good or service corresponding to the electronic activity of interest.

5. The method according to claim 1, wherein the unique identifier comprises a directory number of the entity's wireless device.

6. The method according to claim 5, wherein the location data comprises a country code identifier of the directory number.

7. The method according to claim 1, wherein the one or more subsequent actions comprises accepting the electronic activity of interest or rejecting the electronic activity of interest.

8. The method according to claim 1, wherein the time that the data was obtained from the home location register associated with the home network and the visitor location register associated with the visited network is earlier than a subsequent time of interest pertaining to the electronic activity of interest.

9. The method according to claim 1, wherein generating the pattern value comprises:
   statistically correlating data representing a location of the home network and a data representing the location of the visited network with a location of the entity's wireless device.

10. The method according to claim 1, wherein the subscriber data further comprises network provider identifier, an age associated with a directory number of the electronic device, a first duration of association between the directory number and the first entity, a second duration of association between the first entity and the network provider, a first type of network subscription, or a second type of network device, wherein the pattern value is generated further based at least in part on the network provider identifier, the age associated with the directory number, the first duration, the second duration, the first type of network subscription, and the second type of network device.

11. A server computer, comprising:
   a processor; and
   a non-transitory computer readable medium, the non-transitory computer readable medium comprising code, executable by the processor, for implementing a method, the method comprising:
   obtaining first data from a home location register associated with a home network pertaining to an entity's wireless device based upon a unique identifier of the entity's wireless device, the first data comprising location data associated with the entity's wireless device and subscription data associated with the first entity and a mobile network provider of the home network;
   obtaining second data from a visitor location register associated with a visited network pertaining to the entity's wireless device based upon the unique identifier of the entity's wireless device;
   calculating, based at least in part on the subscription data, an age of a mobile subscription associated with the first entity and the mobile network provider;
   generating a pattern value based on the location data of the first data, based on the age associated with the mobile subscription, based on the second data, based on a time that at least one of the location data or the second data was obtained, and based on an age of the second data obtained from the visitor location register; and
   providing the pattern value to a transaction entity, wherein the receipt of the pattern value by the transaction entity causes the transaction entity to perform one or more subsequent actions with respect to an electronic activity of interest, the electronic activity of interest being associated with the entity's wireless device.

12. The server computer according to claim 11, wherein the generated pattern value indicates a likelihood that the entity will conduct a fraudulent transaction, and wherein the pattern value is provided to the transaction entity prior to receiving the electronic activity of interest associated with the entity's wireless device.

13. The server computer according to claim 11, wherein the pattern value is provided to the transaction entity prior to commencement of a delivery process for providing a good or service corresponding to the electronic activity of interest.

14. The server computer according to claim 11, wherein the unique identifier comprises a directory number of the entity's wireless device.

15. The server computer according to claim 14, wherein the location data comprising a country code identifier of the directory number.

16. The server computer according to claim 11, wherein the one or more subsequent actions comprises accepting the electronic activity of interest or rejecting the electronic activity of interest.

17. The server computer according to claim 11, wherein the subscriber data further comprises network provider identifier, an age associated with a directory number of the electronic device, a first duration of association between the directory number and the first entity, a second duration of association between the first entity and the network provider, a first type of network subscription, or a second type of network device, wherein the pattern value is generated further based at least in part on the network provider identifier, the age associated with the directory number, the first duration, the second duration, the first type of network subscription, and the second type of network device.

18. A system comprising:
   a server computer configured to:
   obtain first data from a home location register associated with a home network pertaining to the entity's wireless device based upon a unique identifier of the entity's wireless device, the first data comprising location data associated with the electronic device and subscription data associated with the first entity and a mobile network provider of the home network;
   obtain second data from a visitor location register associated with a visited network pertaining to the entity's wireless device based upon the unique identifier of the entity's wireless device;
   calculate, based at least in part on the subscription data, an age of a mobile subscription associated with the first entity and the mobile network provider;
   generate a pattern value based on the location data of the first data, based on the age associated with the mobile subscription, based on the second data, based on a time that at least one of the location data or the second data was obtained, and based on an age of the second data obtained from the visitor location register; and
   provide the pattern value to a transaction entity, wherein the receipt of the pattern value by the transaction entity causes the transaction entity to perform one or more subsequent actions with respect to an electronic activity of interest, the electronic activity of interest being associated with the entity's wireless device.

* * * * *

UNITED STATES PATENT AND TRADEMARK OFFICE
CERTIFICATE OF CORRECTION

PATENT NO. : 10,354,253 B2
APPLICATION NO. : 15/427712
DATED : July 16, 2019
INVENTOR(S) : William M. Ferguson et al.

Page 1 of 1

It is certified that error appears in the above-identified patent and that said Letters Patent is hereby corrected as shown below:

In the Claims

Column 26, In Claim 1, Line 13, replace [[the]] with the word an.

Column 26, In Claim 1, Line 14, add of a first entity after the word device and before the word based.

Column 26, In Claim 1, Line 16, replace the word [[electronic]] with entity's wireless.

Column 26, In Claim 2, Line 39, please insert the word --first-- before the word entity.

Column 27, In Claim 10, Lines 7-8, please replace the word [[subscriber]] with the word subscription.

Column 27, In Claim 10, Line 9, replace the word [[electronic]] with entity's wireless.

Column 27, In Claim 11, Line 27, insert --of a first entity-- after the word device and before the word based.

Column 27, In Claim 12, Line 53, please insert the word --first-- before the word entity.

Column 28, In Claim 17, Line 15, please replace the word [[subscriber]] with the word subscription.

Column 28, In Claim 17, Line 17, replace the word [[electronic]] with entity's wireless.

Column 28, In Claim 18, Line 29, replace [[the]] with the word an.

Column 28, In Claim 18, Line 30, insert --of a first entity-- after the word device and before the word based.

Column 28, In Claim 18, Line 32, replace the word [[electronic]] with entity's wireless.

Signed and Sealed this
Seventeenth Day of September, 2019

Andrei Iancu
*Director of the United States Patent and Trademark Office*